United States Patent
Gotoh et al.

(10) Patent No.: US 8,687,889 B2
(45) Date of Patent: Apr. 1, 2014

(54) FORM IMAGE MANAGING SYSTEM AND FORM IMAGE MANAGING METHOD

(75) Inventors: Tomonori Gotoh, Kawasaki (JP); Yosuke Arimura, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 177 days.

(21) Appl. No.: 13/336,802

(22) Filed: Dec. 23, 2011

(65) Prior Publication Data
US 2012/0251002 A1 Oct. 4, 2012

(30) Foreign Application Priority Data

Mar. 30, 2011 (JP) ................................. 2011-073826

(51) Int. Cl.
*G06K 9/00* (2006.01)

(52) U.S. Cl.
USPC ........................................................ 382/173

(58) Field of Classification Search
USPC ......... 382/102, 112, 137–139, 176, 181, 209, 382/217–220, 276, 282, 306; 235/379, 487; 358/403, 450, 452, 453, 462, 464, 540; 715/221, 255, 268, 277
See application file for complete search history.

(56) References Cited

U.S. PATENT DOCUMENTS

| | | | | |
|---|---|---|---|---|
| 4,813,077 A | * | 3/1989 | Woods et al. | 382/138 |
| 5,182,656 A | * | 1/1993 | Chevion et al. | 358/452 |
| 5,521,991 A | * | 5/1996 | Billings | 382/317 |
| 6,640,009 B2 | * | 10/2003 | Zlotnick | 382/224 |
| 8,194,933 B2 | * | 6/2012 | Lei et al. | 382/112 |
| 8,379,914 B2 | * | 2/2013 | Nepomniachtchi et al. | 382/102 |

FOREIGN PATENT DOCUMENTS

| | | |
|---|---|---|
| JP | 10-162087 A | 6/1998 |
| JP | 11-175701 A | 7/1999 |
| JP | 4-287682 A | 10/2004 |
| JP | 2004-287682 A | 10/2004 |
| JP | 2008-117051 A | 5/2008 |
| JP | 2009-110387 A | 5/2009 |

* cited by examiner

*Primary Examiner* — Jose Couso
(74) *Attorney, Agent, or Firm* — Fujitsu Patent Center

(57) ABSTRACT

A form image managing system includes a partitioned master image storing unit which stores partitioned master images obtained by partitioning a master image, a form image obtaining unit which obtains an image of a form, a searching unit which searches the partitioned master image storing unit for a partitioned master image having a high correlation with each of a plurality of partial images obtained by partitioning the image of the form, a difference data generating unit which generates difference data between the partial image and corresponding partitioned master image having the high correlation with the partial image, and a form image data storing unit which stores, as form image data that represents the image of the form, identification information for identifying the corresponding partitioned master image and the difference data by making the identification information and the difference data correspond to the partial image.

17 Claims, 12 Drawing Sheets

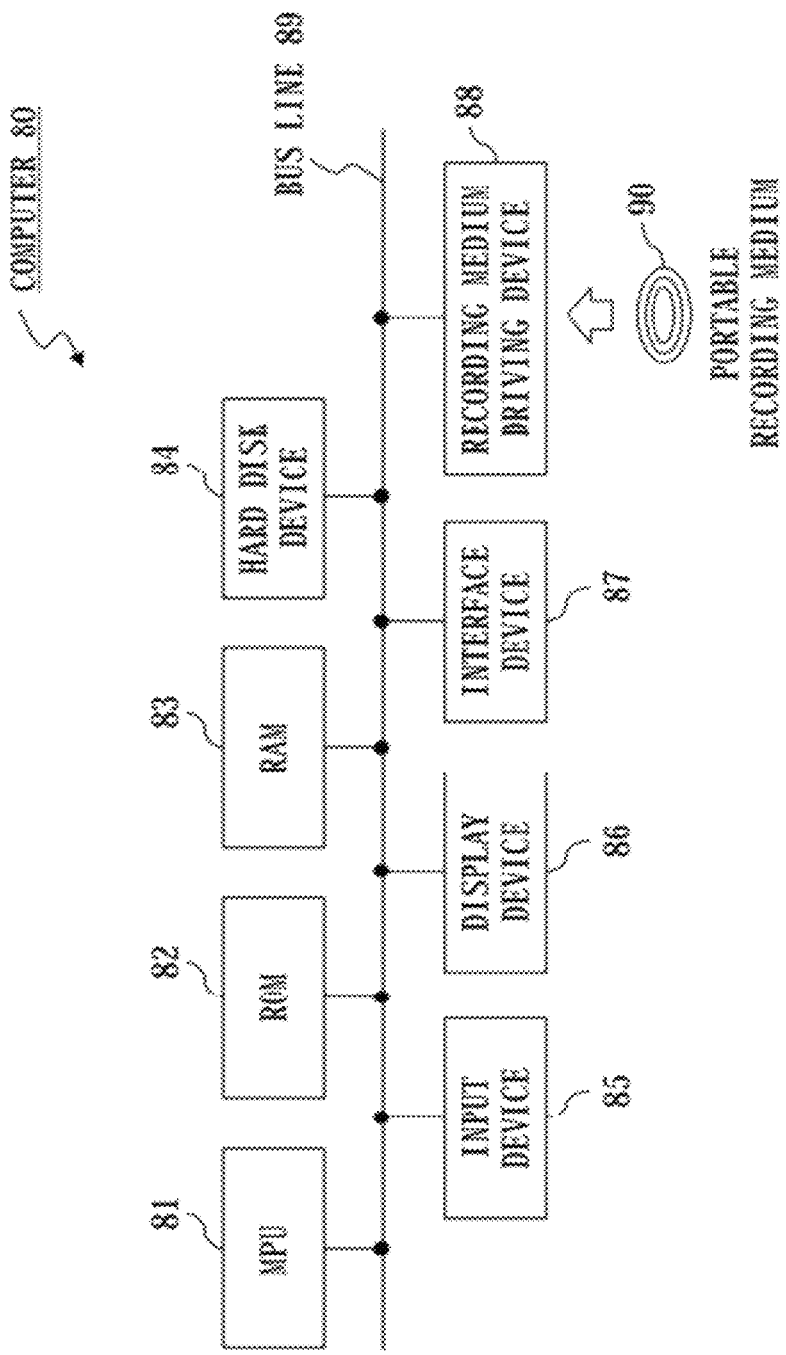
F I G. 2

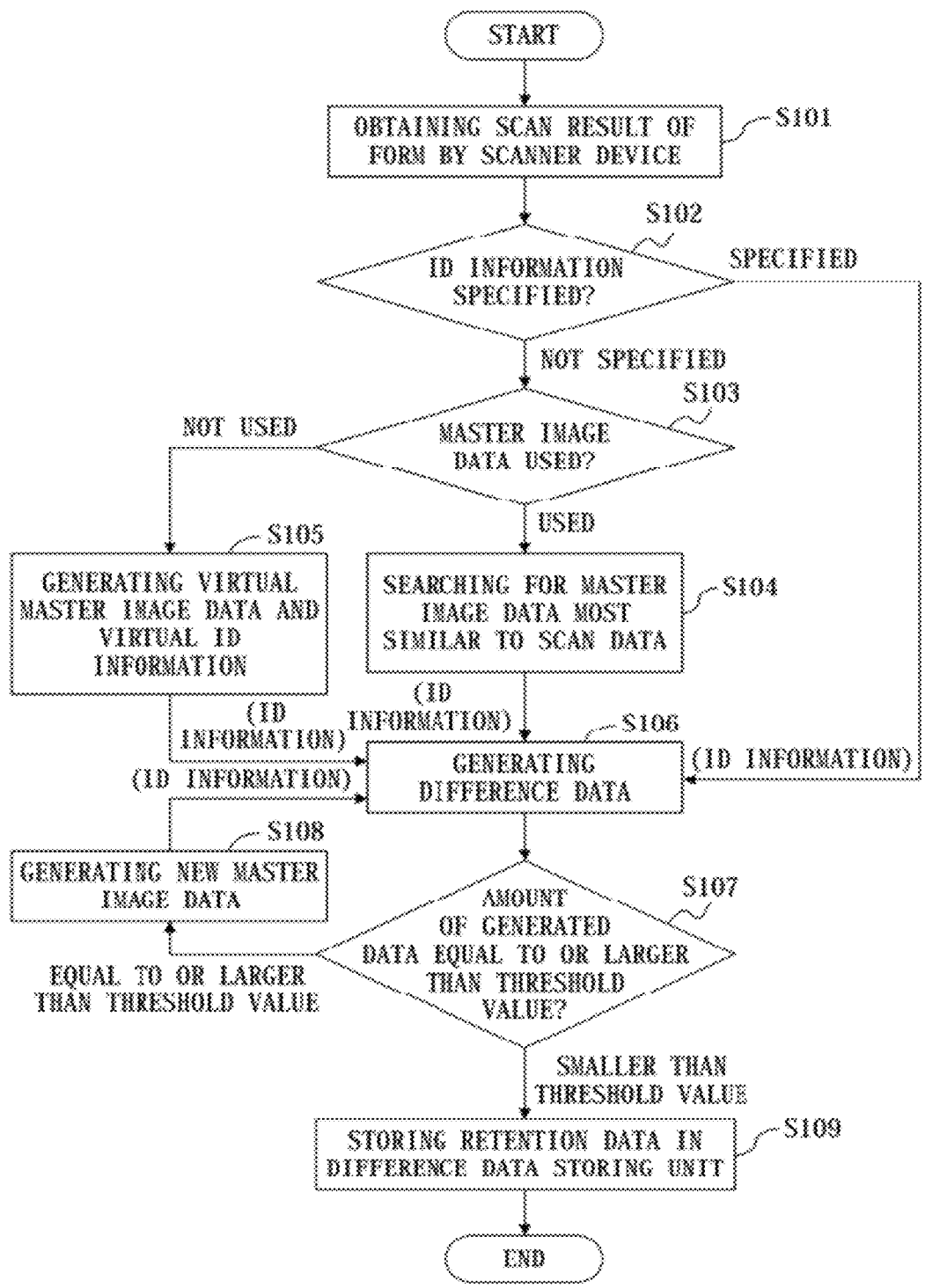
F I G. 4

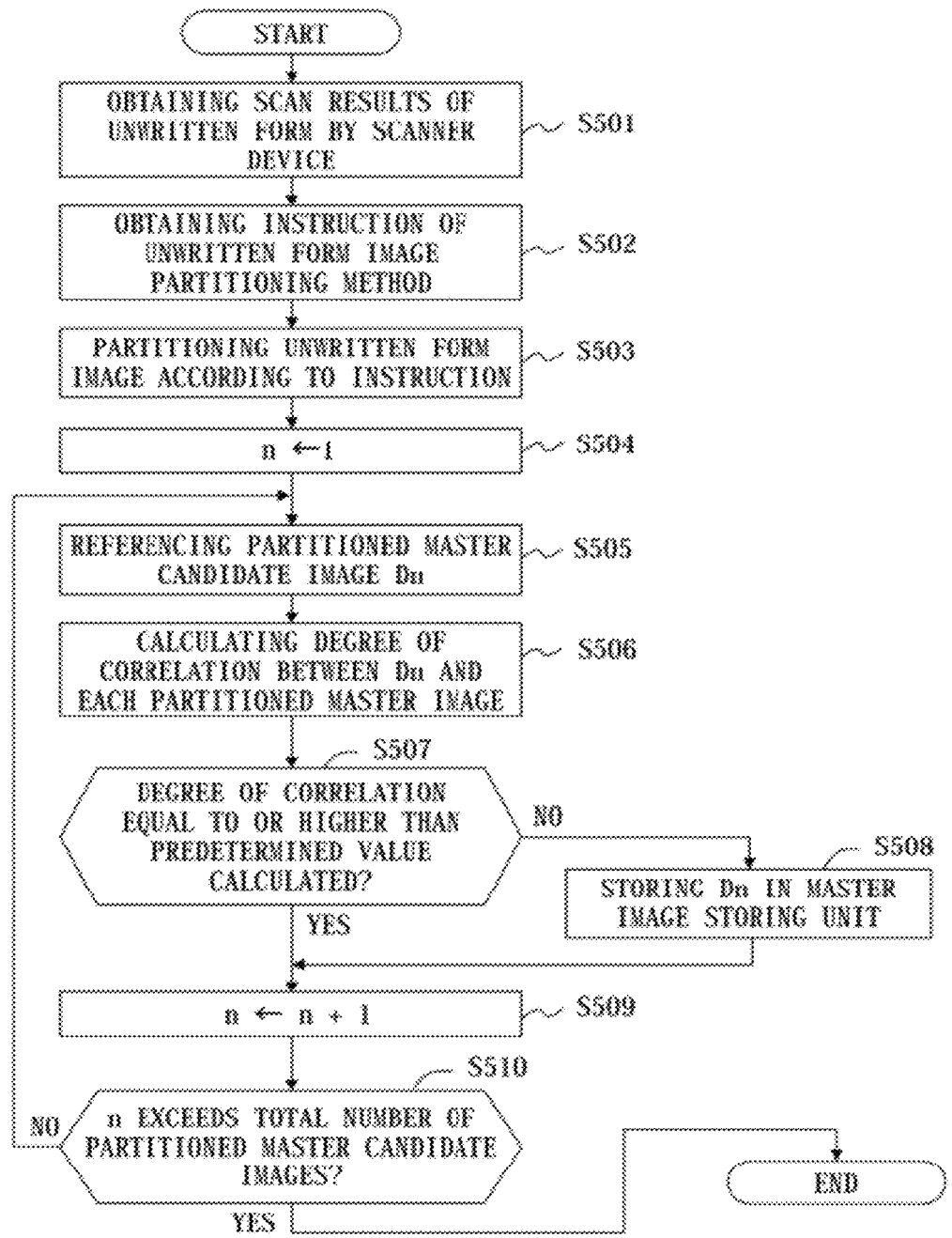
F I G. 10

FORM IMAGE MANAGING SYSTEM AND FORM IMAGE MANAGING METHOD

CROSS-REFERENCE TO RELATED APPLICATION

This application is based upon and claims the benefit of priority of the prior Japanese Patent Application No. 2011-073826, filed on Mar. 30, 2011, the entire contents of which are incorporated herein by reference.

FIELD

The embodiments discussed herein are related to an image information managing technique.

BACKGROUND

A form image managing system for reading a paper form with an image scanner device, for putting the read form into an electronic document, and for retaining obtained form image data as trail information is known. With such a form managing system, the capacity of a storage device for retaining form image data is bloated, leading to a system cost increase and complexity of system operations. For this reason, reductions in the amount of form image data retained in a storage device are demanded. On the other hand, however, an image quality level that is so high as to be available as trail information is demanded for an original form image reproduced from the retained form image data.

For reductions in the amount of form image data, the amount of form image data is compressed, byway of example, with a still image compression technique such as Joint Photographic Experts Group (JPEG) system. However, the bloating of storage capacities in recent form managing systems is serious, and it cannot be said that measures using a data compression rate obtained by applying a still image compression technique are not sufficient against the bloating of storage capacities under present circumstances.

Incidentally, as another technique for reducing the amount of form image data, a technique for generating a difference image between an image of a known form where data is not written and an image of the form after data is written, and for recording the difference image data with a recording device is known.

Also a technique for reducing the amount of information of a difference image generated as described above is known. With this technique, identification is initially made between a character area and other areas in a script image of an electronic document. Next, identification is made between a character area and other areas in an image superimposed by handwriting the electronic document. Then, the amount of a position shift is detected between each of the areas in the script image and each of the areas in the superimposed image, and a difference process is executed by correcting a position based on the detected amount of a position shift, thereby preventing a subtraction from being incompletely performed in the difference process. However, this technique is a technique for recording only a hand-written portion, and subsequent reproduction of the superimposed image is not taken into account. Accordingly, this technique is not suitable for a use application intended to handle recorded data as trail information the originality of which needs to be assured. Moreover, with this technique, a position of an image of a known form and that of an image of the form after data is written are aligned in order to reduce the amount of difference image data. Therefore, this technique needs complicated process steps of initially making an identification between a character area and other areas in each of two images, of aligning positions of the images after obtaining the amount of a position shift between the images based on an identification result, and of generating a difference image thereafter.

In addition, a form management technique is known. With this technique, when a form name is selected, a print medium on which an image of the selected form and a barcode indicating its retention location name are printed is output, and the image of the form is stored in the retention location indicated by the barcode when an image where data is written is input to the print medium.

Furthermore, a form creation technique is known. With this technique, a form ID of a form to be created is generated based on a template ID created from a form template and a form data ID created from overlaying form data, and the form template of the form to be generated and the form data are managed to be identifiable.

Still further, a technique for preventing information of a common portion within derived documents from being scattered when the derived documents are created by partially changing a master document is known. With this technique, difference information that indicates contents of a change made to a plurality of blocks into which the master document is partitioned, and information that identifies a block including the changed portion are retained as information of the derived documents.

Techniques described in the following documents are known.

Document 1: Japanese Laid-open Patent Publication No. H11-175701
Document 2: Japanese Laid-open Patent Publication No. 2004-287682
Document 3: Japanese Laid-open Patent Publication No. H10-162087
Document 4: Japanese Laid-open Patent Publication No. 2009-110387
Document 5: Japanese Laid-open Patent Publication No. 2008-117051

SUMMARY

According to one aspect of the embodiment, a form image managing system includes a master image obtaining unit which obtains a master image, a partitioning unit which partitions the obtained master image, a partitioned master image storing unit which stores partitioned images obtained by partitioning the master image by the partitioning unit as partitioned master images, a form image obtaining unit which obtains an image of a form, a searching unit which searches the partitioned master image storing unit for a partitioned master image having a high correlation with each of a plurality of partial images obtained by partitioning the image of the form, a difference data generating unit which generates difference data between the partial image and corresponding partitioned master image having the high correlation with the partial image, and a form image data storing unit which stores, as form image data that represents the image of the form, identification information for identifying the corresponding partitioned master image and the difference data generated by the difference data generating unit by making the identification information and the difference data correspond to the partial image.

According to another aspect of the embodiment, a form image managing system includes a master image obtaining unit which obtains a master image, a partitioning unit which partitions the obtained master image, a partitioned master image storing unit which stores partitioned images obtained by partitioning the master image by the partitioning unit as partitioned master images, a correlation degree calculating unit which calculates a degree of correlation between one partitioned master image obtained by partitioning the master image and each of the plurality of partitioned master images stored in the partitioned master image storing unit, and a storage controlling unit which performs a control for storing the one partitioned master image in the partitioned master image storing unit if the degree of correlation is lower than a predetermined value.

According to a further aspect of the embodiment, a form image managing system includes a master image obtaining unit which obtains a master image, a partitioning unit which partitions the obtained master image, a partitioned master image storing unit which stores partitioned images obtained by partitioning the master image by the partitioning unit as partitioned master images, a form image obtaining unit which obtains an image of a form, a difference data generating unit which generates difference data between a partial image obtained by partitioning the image of the form and a corresponding partitioned master image having the smallest difference to the partial image among the partitioned master images stored in the partitioned master image storing unit, and a form image data storing unit which stores, as form image data that represents the image of the form, identification information for identifying the corresponding partitioned master image and the difference data generated by the difference data generating unit by making the identification information and the difference data correspond to the partial image.

The object and advantages of the embodiment will be realized and attained by means of the elements and combinations particularly pointed out in the claims.

It is to be understood that both the forgoing general description and the following detailed description are exemplary and explanatory and are not restrictive of the embodiment, as claimed.

BRIEF DESCRIPTION OF DRAWINGS

FIG. 2 illustrates one example of a configuration of a computer available to the form image managing system.

FIG. 4 is a flowchart illustrating contents of a first example of a form image storage control process.

FIG. 10 is a flowchart illustrating contents of a partitioned master image storage control process.

DESCRIPTION OF EMBODIMENTS

Preferred embodiments of the present invention will be explained with reference to accompanying drawings.

Meanings of a term "form" are initially defined. Normally, the term "form" is a generic name of ledger sheets, slips and the like used for various types of paperwork and accounting operations. In this application, in addition to the above described normal meaning, the term "form" has a meaning of general paper, such as answer sheets used for diverse types of examinations, ballot papers used for elections, and the like, on which an image of a predetermined style is printed in advance and to which information is added by being handwritten, stamped, printed or the like.

Figure 1:
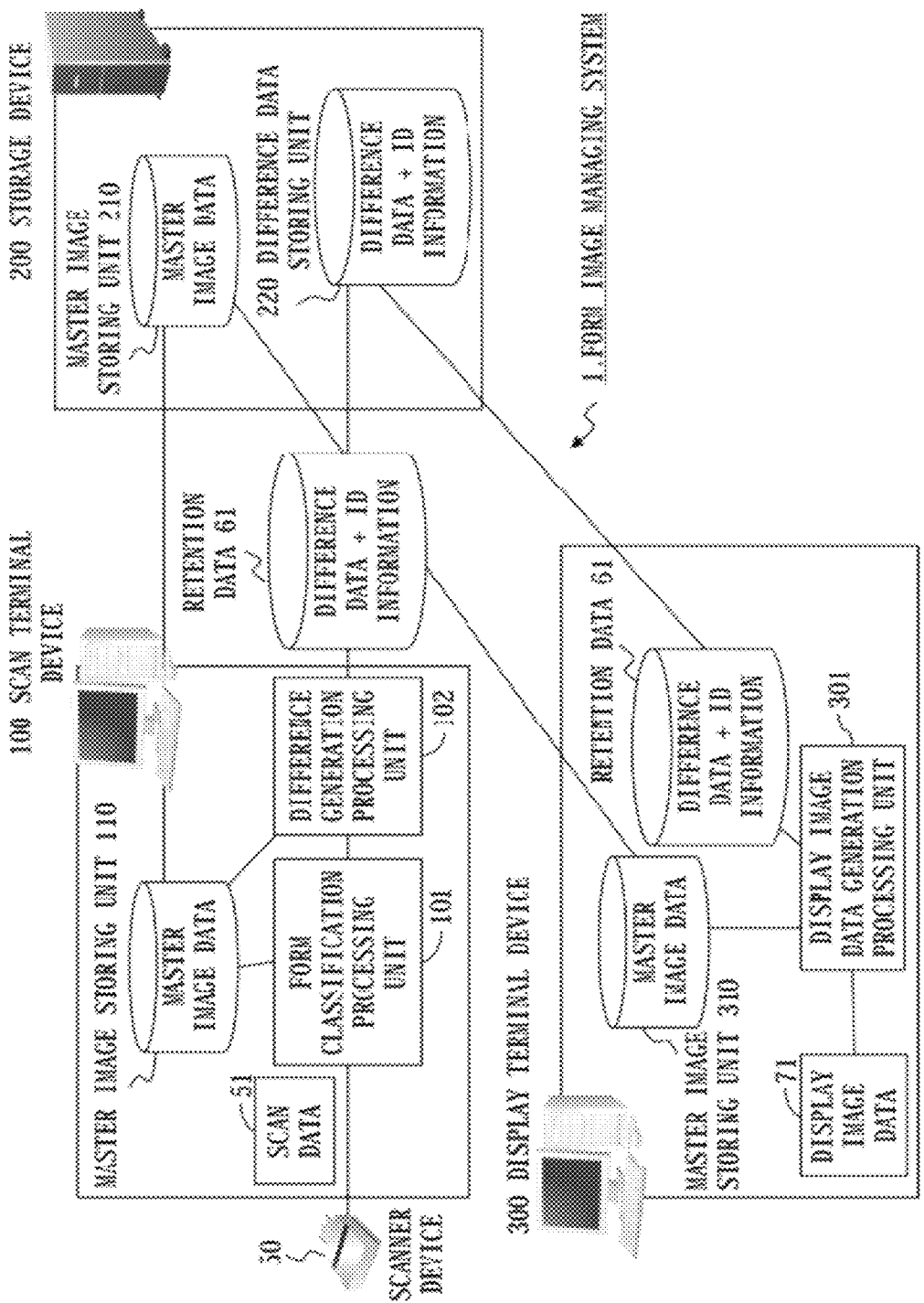
FIG. 1 illustrates a system configuration of an embodiment of a form image managing system.

FIG. 1 is described next. FIG. 1 illustrates a system configuration of one embodiment of a form image managing system. This form image managing system 1 is configured by including a scan terminal device 100, a storage device 200 and a display terminal device 300. The scan terminal device 100, the storage device 200 and the display terminal device 300 are interconnected via a communication network not illustrated, and can transmit/receive various types of data via the communication network.

The scan terminal device 100 obtains an image of a form, and generates data for retention of the image. The scan terminal device 100 includes a master image storing unit 110. To the scan terminal device 100, a scanner device 50 is connected.

The master image storing unit 110 is a storage configured to store image data of a plurality of types of master images. The image data of master images stored in the master image storing unit 110 can be individually identified by using Identification Data (ID) information that is identification information for individually identifying each piece of the image data. As the ID information, for example, a name of an image data file of a master image, and index information associated with the name of the file can be used.

The scanner device 50 reads a form, and outputs scan data 51 that represents an image of the form.

The scan terminal device 100 includes a form classification processing unit 101 and a difference generation processing unit 102 as function blocks.

The form classification processing unit 101 executes a process for searching for image data of a master image most similar to the scan data 51 output from the scanner device 50 from among the plurality of types of image data stored in the master image storing unit 110.

The difference generation processing unit 102 initially executes a process for generating difference data of the scan data 51 output from the scanner device 50 from the image data of the master image, which is read from the master image storing unit 110 by the form classification processing unit 101. Then, the difference generation processing unit 102 executes a process for generating retention data 61 by making ID information that is identification information for identifying the image data of the master image, which is read from the master image storing unit 110 by the form classification processing unit 101, correspond to the generated difference data, and for transmitting the generated retention data 61 to the storage device 200. The retention data 61 represents the image of the form read by the scanner device 50, and this is data stored and retained in the storage device 200 as a replacement for the scan data 51 output from the scanner device 50.

The storage device 200 stores and retains the data for retention of the image of the form, which is generated by the scan terminal device 100. The storage device 200 includes a master image storing unit 210 and a difference data storing unit 220.

The master image storing unit 210 is a storage configured to store image data of a plurality of types of master images. In the master image storing unit 110 of the scan terminal device 100, the master image storing unit 210 of the storage device 200, and a master image storing unit 310, which will be described later, of the display terminal device 300, image data of the same master images are placed in advance. Moreover, if image data of a new master image is stored in the master image storing unit 110 of the scan terminal device 100 as will be described later, the same master image data is stored also in the master image storing units 210 and 310.

In this embodiment, the master image storing unit 210 of the storage device 200 is not always essential if identical master images are pre-stored in the master image storing unit 110 of the scan terminal device 100 and the master image storing unit 310 of the display terminal device 300.

The difference data storing unit 220 stores and retains the retention data 61 transmitted from the scan terminal device 100.

The display terminal device 300 reads the data retained in the storage device 200, restores and displays an image of an original form represented with the read data. The display terminal device 300 includes the master image storing unit 310.

The master image storing unit 310 is a storing unit configured to store image data of master images of a plurality of types identical to those in the master image storing units 110 and 210. Note that the image data of the master images stored in the master image storing unit 310 can be individually identified by using ID information identical to those used to identify the image data of the master images stored in the master image storing unit 110.

The display terminal device 300 includes a display image data generation processing unit 301 as a function block.

The display image data generation processing unit 301 initially executes a process for reading the retention data 61 from the difference data storing unit 220 of the storage device 200. Next, the display image data generation processing unit 301 executes a process for reading, from the master image storing unit 310, image data of a master image identified based on ID information included in the retention data 61. Then, the display image data generation processing unit 301 executes a process for generating display image data 71 that represents the image by restoring the image of the form read by the scanner device 50 based on difference data included in the retention data 61 and the image data of the master image read from the master image storing unit 310.

The scan terminal device 100, the storage device 200 or the display terminal device 300, which are included in the form image managing system 1 of FIG. 1, can be configured by using a computer having a standard hardware configuration. FIG. 2 illustrates a configuration of one example of a computer available to the form image managing system 1.

The computer 80 includes an MPU 81, a ROM 82, a RAM 83, a hard disk device 84, an input device 85, a display device 86, an interface device 87 and a recording medium driving device 88. These components are interconnected via a bus line 89, and can mutually transmit/receive various types of data under management of the MPU 81.

The MPU (Micro Processing Unit) 81 is a processor for controlling operations of the entire computer 80, and functions as a control processing unit of the computer 80.

The ROM (Read Only Memory) 82 is a read-only semiconductor memory in which a predetermined basic control program is prerecorded. The MPU 81 reads and executes this basic control program at the startup of the computer 80, whereby operations of the components of the computer 80 can be controlled.

The RAM (Random Access Memory) 83 is an on-demand readable/writable semiconductor memory that the MPU 81 uses as a working storage area if necessary when executing various types of control programs.

The hard disk device 84 is a storage device for storing various types of control programs executed by the MPU 81, and various types of data. The MPU 81 reads and executes a predetermined control program stored in the hard disk device 84, so that it can execute various types of control processes to be described later. If this computer 80 is used as the storage device 200 of FIG. 1, the hard disk device 84 is also used as the master image storing unit 210 and the difference data storing unit 220. Alternatively, if this computer 80 is used as the scan terminal device 100 or the display terminal device 300, the hard disk device 84 is used also as the master image storing unit 110 or 310.

The input device 85 is, for example, a mouse device or a keyboard device. When being operated by a user of the form image managing system 1 of FIG. 1, the input device 85 obtains an input of each type of information made to correspond to content of the operation, and transmits the obtained input information to the MPU 81.

The display device 86 is, for example, a liquid crystal display, and displays various types of texts and images according to display data transmitted from the MPU 81. For example, if the computer 80 is used as the display terminal device 300 of FIG. 1, the display device 86 displays a restored image, which is represented with display image data 71 restored by the display image data generation processing unit 301, of a form read by the scanner device 50.

The interface device 87 manages transmissions/receptions of various types of information among various types of devices connected to the computer 80. More specifically, the interface device 87 manages, for example, transmissions/receptions of various types of data such as master image data, the above described retention data 61 and the like, which are performed via the communication network among the scan terminal device 100, the storage device 200 and the display terminal device 300, which are illustrated in FIG. 1. Alternatively, if the computer 80 is used as the scan terminal device 100 of FIG. 1, the interface device 87 receives scan data 51 that is output from the scanner device 50, and transmits the received data to the MPU 81.

The recording medium driving device 88 is a device for reading various types of control programs or data, which are recorded on a portable recording medium 90. The MPU 81 may be caused to execute various types of control processes to be described later by reading and executing a predetermined control program recorded on the portable recording medium 90 via the recording medium driving device 88. Examples of the portable recording medium 90 include a flash memory having a USB (Universal Serial Bus) standard connector, a CD-ROM (Compact Disc-Read Only Memory), a DVD-ROM (Digital Versatile Disc-Read Only Memory) and the like.

To configure the scan terminal device 100, the storage device 200 or the display terminal device 300 by using such a computer 80, for example, a control program for causing the MPU 81 to execute various types of control processes to be described later is created. The created control program is pre-stored in the hard disk device 84 or on the portable recording medium 90. Then, a predetermined instruction is given to the MPU 81, which is caused to read and execute the control program. As a result, the functions respectively possessed by the scan terminal device 100, the storage device 200 or the display terminal device 300 are provided by the MPU 81. Accordingly, the computer 80 functions as the scan terminal device 100, the storage device 200 or the display terminal device 300.

Figure 3:
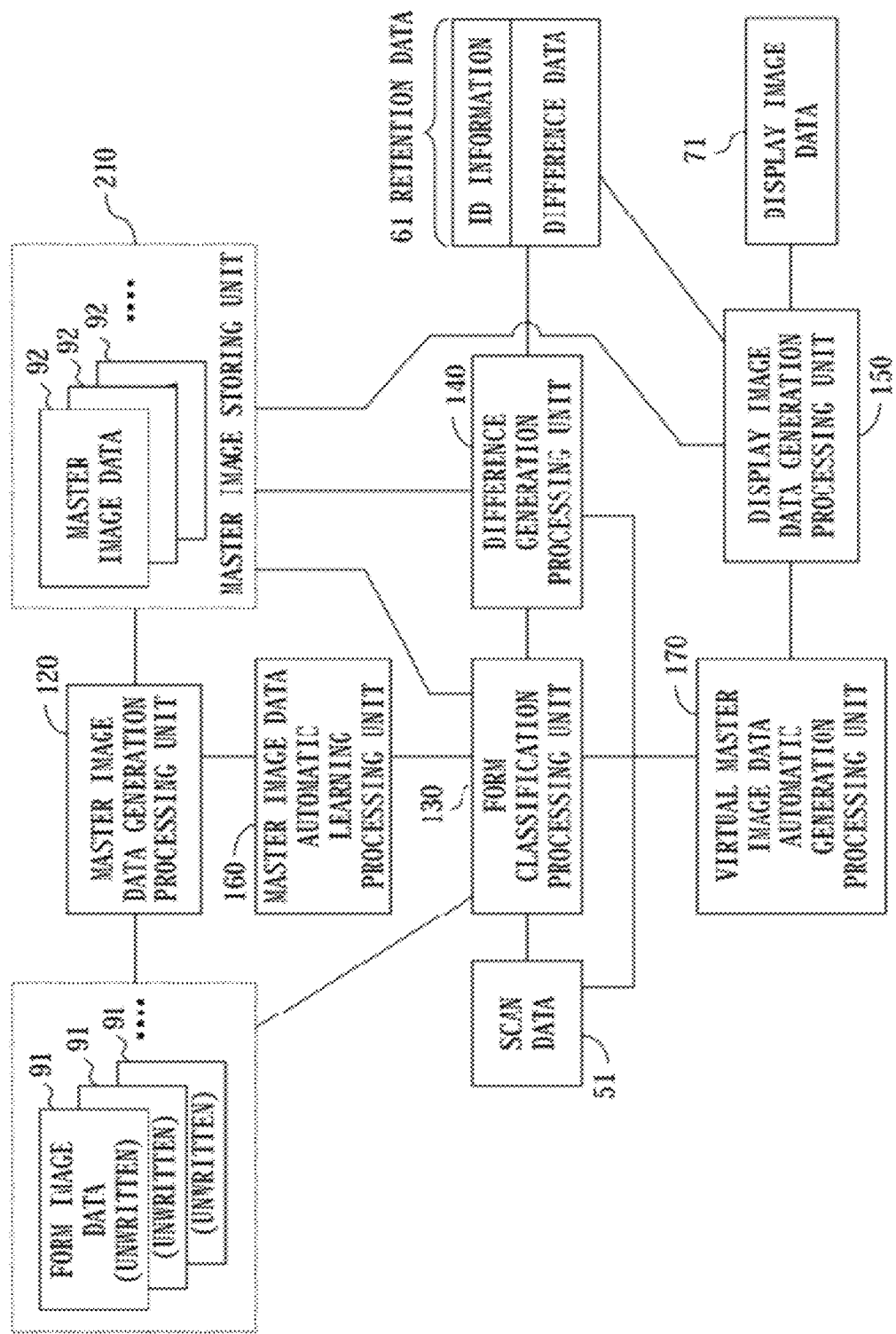
FIG. 3 illustrates a first example of details of a function block configuration of the form image managing system of FIG. 1.

FIG. 3 is described next. FIG. 3 illustrates a first example of details of a block configuration of the form image managing system 1 of FIG. 1. Functions of these function blocks can be provided by the computer 80 having the configuration of FIG. 2.

In FIG. 3, the master image storing units 110, 210 and 310, which store identical master image data and information for identifying master images as described above, are generically referred to as the "master image storing unit 210" for ease of explanation.

The computer 80 provides functions of a master image data generation processing unit 120, a form classification processing unit 130, a difference generation processing unit 140, a display image data generation processing unit 150, a master image data automatic learning processing unit 160 and a virtual master image data automatic generation processing unit 170. In this embodiment, the master image data generation processing unit 120, the form classification processing unit 130, the difference generation processing unit 140 and the master image data automatic learning processing unit 160 are included in the scan terminal device 100 of FIG. 1. Additionally, the display image data generation processing unit 150 is included in the display terminal device 300 of FIG. 1. The virtual master image data automatic generation processing unit 170 is respectively included in the scan terminal device 100 and the display terminal device 300, which are illustrated in FIG. 1.

The master image data generation processing unit 120 executes a process for storing, in the master image storing unit 210, data (form image data 91) of images of a plurality of types of (unwritten) forms before information is added by being hand-written or the like, along with identification information for each image, as master image data 92. Moreover, upon receiving image data of a new master image from the master image data automatic learning processing unit 160 to be described later, the master image data generation processing unit 120 executes a process for newly storing the received image data in the master image storing unit 210 as the master image data 92.

The form classification processing unit 130 is a processing unit equivalent to the form classification processing unit 101 of FIG. 1. More specifically, the form classification processing unit 130 executes the following processes.

Initially, the form classification processing unit 130 executes a process for obtaining scan data 51 that is output from the scanner device 50 and represents an image of a (written) form after information has been added by being hand-written or the like.

Additionally, the form classification processing unit 130 executes a process for selecting an image, which is most similar to the image of the form represented with the scan data 51 obtained from the scanner device 50, from among a plurality of types of form images the master image data 92 of which are stored in the master image storing unit 210. Specifically, this process is executed as follows.

Initially, the form classification processing unit 130 executes a process for calculating a mutual correlation coefficient between each piece of the master image data 92 and the scan data 51 for an array that represents values of pixels that configure the image. Next, the form classification processing unit 130 executes a process for selecting master image data 92 by which a coefficient indicating the maximum positive correlation is obtained in the mutual correlation coefficient calculation process. In this way, an image most similar to the image of the form represented with the scan data 51 is selected.

Note that the form classification processing unit 130 may execute the above described selection process with another method.

The form classification processing unit 130 executes a process for obtaining ID information for identifying thus selected master image data 92 from the master image storing unit 210, and for transmitting the obtained ID information to the difference generation processing unit 140.

Upon receiving, from a user of the system, an input of specifying the ID information for designating the master image, the form classification processing unit 130 executes a process for transmitting the received ID information to the difference generation processing unit 140 unchanged without executing the above described selection process.

Additionally, the form classification processing unit 130 executes a process for obtaining a data size of retention data 61 generated by the difference generation processing unit 140 to be described later, and for determining whether or not the data size is equal to or larger than a predetermined threshold value. Here, if the data size is equal to or larger than the predetermined threshold value, the form classification processing unit 130 executes a process for causing the master image data automatic learning processing unit 160 to start operations to be described later by giving a predetermined instruction and scan data 51 corresponding to the retention data 61 to the master image data automatic learning processing unit 160.

Furthermore, there are cases where the form classification processing unit 130 receives, from the user of the system, an input of instructing not to use the master image data 92 stored in the master image storing unit 210. Alternatively, there are cases where no master image data 92 is stored in the master image storing unit 210. In such cases, the form classification processing unit 130 executes a process for causing the virtual master image data automatic generation processing unit 170 to start operations to be described later by giving a predetermined instruction to the virtual master image data automatic generation processing unit 170. Then, the form classification processing unit 130 executes a process for transferring, to the difference generation processing unit 140, virtual master image data generated and transmitted by the virtual master image data automatic generation processing unit 170 according to the instruction, and ID information that is information for identifying an image corresponding to the virtual master image data.

The difference generation processing unit 140 is a processing unit equivalent to the difference generation processing unit 102 of FIG. 1. More specifically, the difference generation processing unit 140 executes the following processes.

Initially, the difference generation processing unit 140 executes a process for obtaining the same scan data 51 as that obtained by the form classification processing unit 130 from the scanner device 50.

Additionally, the difference generation processing unit 140 executes a process for receiving ID information that is information for identifying a master image transmitted from the form classification processing unit 130. Moreover, the difference generation processing unit 140 executes a process for reading, from the master image storing unit 210, master image data 92 corresponding to the ID information that is information for identifying the master image by referencing the master image storing unit 210. If virtual master image data is transmitted from the form classification processing unit 130, the difference generation processing unit 140 executes a process for receiving the virtual master image data, and does not execute the process for reading master image data from the master image storing unit 210. In subsequent processes, the received virtual master image data is used as a replacement for the master image data 92 read from the master image storing unit 210.

Next, the difference generation processing unit 140 executes a process for generating difference data of the scan data 51, which is obtained from the scanner device 50, from the master image data 92 (or the above described virtual master image data) read from the master image storing unit 210. Specifically, this process is executed as follows.

Initially, the difference generation processing unit 140 executes, for the image of the form represented with the scan data 51 obtained from the scanner device 50, a motion compensation inter-frame prediction process based on the master image represented with the master image data 92 read from the master image storing unit 210. The motion compensation inter-frame prediction process is executed, for example, as follows.

Initially, a process for partitioning each of image areas of the image of the form and the master image into a plurality of elements of a predetermined size is executed. Next, a process for obtaining a motion direction and a motion amount of each of the elements based on the assumption that the image of the form is generated with a move of the master image is executed. Then, a process for obtaining a motion vector in the move from the master image to the image of the form based on the obtained motion direction and motion amount is executed. Next, a process for creating a prediction image of the form based on the motion vector by moving the master image according to the obtained motion vector is executed. Then, a process for obtaining a motion compensation inter-frame prediction error by calculating a difference between the created prediction image and the image of the form is executed.

The difference generation processing unit 140 executes a process for generating motion vector information and motion compensation inter-frame prediction error information, which are obtained with the motion compensation inter-frame prediction process, as difference data of the above described form image from the master image. The difference data is generated in this way.

Next, the difference generation processing unit 140 executes a process for generating retention data 61 by making the ID information that is information for identifying the master image and received from the form classification processing unit 130 correspond to the generated difference data. Additionally, the difference generation processing unit 140 executes a process for transmitting the generated retention data 61 to the storage device 200, and for storing the data in the difference data storing unit 220. If the difference data is generated by using virtual master image data, the difference generation processing unit 140 initially executes a process for generating retention data 61 by making the ID information that is information for identifying a master image and attached to the virtual master image data correspond to the difference data. Thereafter, the difference generation processing unit 140 executes a process for storing the generated retention data 61 in the difference data storing unit 220.

Note that the difference generation processing unit 140 may execute a data compression process for the generated difference data, and may further execute a process for generating retention data 61 by making the ID information for identifying the master image correspond to the difference data for which the data compression process has been executed, and for storing the data in the difference data storing unit 220. A compression method and a data compression rate of the data compression process may be arbitrarily selected. In this embodiment, however, the compression method and the data compression rate are preferably selected by considering that a later restored image of the form image should have an image quality level sufficiently available as trail information.

Alternatively, if new master image data 92 is stored in the master image storing unit 210 by the master image data generation processing unit 120, the difference generation processing unit 140 executes the following processes.

Initially, the difference generation processing unit 140 executes a process for generating difference data of the scan data 51, which is obtained from the scanner device 50, from the new master image data 92. Then, the difference generation processing unit 140 generates retention data 61 by making ID information for identifying the new master image data 92 correspond to the generated difference data, and for storing the generated retention data 61 in the difference data storing unit 220.

The display image data generation processing unit 150 executes the following processes.

Initially, the display image data generation processing unit 150 executes a process for reading retention data 61 identified with an instruction from the difference data storing unit 220 by referencing the difference data storing unit 220 of the storage device 200 upon receiving an input of the predetermined instruction from a user of the system. If a data compression process has been executed for difference data included in the read retention data 61, the display image data generation processing unit 150 restores original difference data by executing a data decompression process for the difference data.

Next, the display image data generation processing unit 150 executes a process for reading, from the master image storing unit 210, the master image data 92 identified with ID information included in the retention data 61 read from the difference data storing unit 220.

However, the ID information included in the retention data 61 read from the difference data storing unit 220 is sometimes information that identifies virtual master image data generated by the virtual master image data automatic generation processing unit 170. In this case, the display image data generation processing unit 150 executes a process for causing the virtual master image data automatic generation processing unit 170 to start operations to be described later by giving a predetermined instruction to the virtual master image data automatic generation processing unit 170. Then, the display image data generation processing unit 150 executes a process for obtaining the virtual master image data that is generated and transmitted by the virtual master image data automatic generation processing unit 170 according to the instruction. In subsequent processes, the received virtual master image data is used as a replacement for the master image data 92 read from the master image storing unit 210.

Next, the display image data generation processing unit 150 executes a process for restoring the image of the original form from difference data included in the read retention data 61, and the master image data 92 read from the master image storing unit 210 (or the above described virtual master image data). Specifically, this process is executed as follows.

Initially, the display image data generation processing unit 150 executes a process for generating the same prediction image as that generated with the motion compensation inter-frame prediction process executed by the difference generation processing unit 140. This prediction image can be generated by using the master image data 92 read from the master image storing unit 210 (or the above described virtual master image data), and motion vector information within the difference data included in the read retention data 61.

Next, the display image data generation processing unit 150 executes a process for adding, to the generated prediction image, a prediction error represented by motion compensation inter-frame prediction error information included in the difference data within the read retention data 61. With this process, display image data 71 is generated.

Then, the display image data generation processing unit 150 executes a process for causing the display device 86 included in the display terminal device 300 to display an image that is represented with the display image data 71 obtained as described above and restored as the image of the form obtained by the scanner device 50.

The master image data automatic learning processing unit 160 executes a process for transferring, to the master image data generation processing unit 120, the scan data 51 received along with the above described predetermined instruction as image data of a new master image upon receiving the instruction from the form classification processing unit 130.

The virtual master image data automatic generation processing unit 170 executes a process for generating virtual master image data that is a master image represented with a mathematical expression by calculating the mathematical expression upon receiving the above described predetermined instruction from the form classification processing unit 130. In this embodiment, the virtual master image data automatic generation processing unit 170 executes the process for generating image data of the totally blank image where no image is recorded by maximizing all brightness values of pixels that configure the image. Thereafter, the virtual master image data automatic generation processing unit 170 executes a process for making ID information for identifying thus generated virtual master image data from other master image data correspond to the virtual master image data, and for transmitting the generated virtual master image data and the ID information to the form classification processing unit 130.

Additionally, the virtual master image data automatic generation processing unit 170 executes a process for similarly generating the same virtual master image data as that generated according to the instruction from the form classification processing unit 130 upon receiving the above described process instruction from the display image data generation processing unit 150. Thereafter, the virtual master image data automatic generation processing unit 170 executes a process for transmitting thus generated virtual master image data to the display image data generation processing unit 150.

The function blocks of the form image managing system 1 illustrated in FIG. 3 respectively provide the above described functions.

FIG. 4 is described next. FIG. 4 is a flowchart illustrating contents of a first example of a form image storage control process executed by the MPU 81 when the computer 80 of FIG. 2 used as the scan terminal device 100 in the form image managing system 1 of FIG. 1.

The process of FIG. 4 is started when the MPU 81 detects that a user of the scan terminal device 100 inputs a predetermined process start instruction via the input device 85. Assume that the process for storing master image data 92 in the master image storing units 110, 210 and 310 has been executed before this process is started. In the process of FIG. 4, also assume that master image data 92 is read from the master image storing unit 110 when the master image data 92 is used. In the process of FIG. 4, further assume that the master image data 92 is also stored in the other master image storing units 210 and 310 if the master image data 92 is stored in the master image storing unit 110.

In FIG. 4, processes in S101 to S104 are processes executed by the form classification processing unit 130 in the configuration of FIG. 3.

Initially, in S101, a process for obtaining scan data 51 that represents an image of a form, which is output from the scanner device 50, after information has been added (written) by being hand-written or the like is executed.

Next, in S102, a process for determining whether or not an input of ID information for specifying a master image has been received from the user of the scan terminal device 100 via the input device 85 is executed. If it is determined that the input of the ID information for specifying the master image has been received, the flow goes to S106. Alternatively, if it is determined in this determination process that the input of the ID information for specifying the master image has not been received, the flow goes to S103.

Next, in S103, a process for determining whether or not to generate retention data 61 for the image of the form by using master image data 92 stored in the master image storing unit 110 is executed.

In this embodiment, if no master image data 92 is stored in the master image storing unit 110, it is determined to generate the retention data 61 without using the master image data 92 in the determination process of S103. Also if an instruction not to use the master image data 92 has been received from the user of the scan terminal device 100 via the input device 85, it is determined to generate the retention data 61 without using the master image data 92 in the determination process of S103. Otherwise, it is determined to generate the retention data 61 by using the master image data 92 in the determination process of S103.

If it is determined to generate the retention data 61 by using the master image data 92 in the determination process of S103, the flow goes to S104. Alternatively, if it is determined to generate the retention data 61 without using the master image data 92 in the determination process of S103, the flow goes to S105.

In S104, a process for searching the master image storing unit 110 for master image data 92 that is most similar to the image of the form represented with the scan data 51 obtained with the process of S101 is executed. Specifically, in this process, a process for calculating a mutual correlation coefficient between each piece of the master image data 92 and the scan data 51 for an array that represents values of pixels that configure the image is initially executed as described above as the operation performed by the form classification processing unit 130. Next, a process for obtaining ID information that corresponds to the master image data 92 by selecting, from the master image storing unit 110, the master image data 92 by which the coefficient that indicates the maximum positive correlation is obtained is executed.

Upon completion of the process of S104, the flow goes to S106.

In the meantime, in S105, a process for generating virtual master image data, and for generating ID information for identifying the virtual master image data from other master image data is executed. This process is a process executed by the virtual master image data automatic generation processing unit 170 in the configuration of FIG. 3, and this is a process for generating the virtual master image data that is a master image represented with a mathematical expression by calculating the mathematical expression. Upon completion of the process of S105, the flow goes to S106.

In S106, a process for generating difference data is executed. This process is a process executed by the difference generation processing unit 140 in the configuration of FIG. 3. More specifically, the following processes are executed.

Initially, a process for reading, from the master image storing unit 110, master image data 92 corresponding to the ID information obtained by executing the process of S104 by referencing the master image storing unit 110 is executed. However, if it is determined that the input of the ID information that specifies the master image has been received in the determination process of S102, a process for reading the master image data 92 corresponding to the received ID information from the master image storing unit 110 is executed instead of executing the above described process. Alternatively, if virtual master image data has been generated by executing the process of S105, the generated virtual master image data is used as the master image data 92 read from the master image storing unit 110 in subsequent processes. Alternatively, if image data of a new master image has been generated by most recently executing a process of S108 to be described later, the image data of the new master image is used as the master image data 92 read from the master image storing unit 110 in the subsequent processes.

Next, a motion compensation inter-frame prediction process based on a master image represented with the master image data 92 read from the master image storing unit 110 is executed for the image of the form represented with the scan data 51 obtained with the process of S101. Then, a process for generating motion vector information and motion compensation inter-frame prediction error information, which are obtained with this prediction process, as difference data of the image of the form from the master image is executed.

Next, a process for generating retention data 61 by making the ID information obtained with the process of S104 correspond to the generated difference data is executed. However, if it is determined in the determination process of S102 that the input of the ID information for specifying the master image has been received, a process for generating the retention data 61 by making the received ID information correspond to the generated difference data is executed. Alternatively, if the virtual master image data has been generated by executing the process of S105, a process for generating the retention data 61 by making the ID information, which is generated along with the virtual master image data when the process of S105 is executed, correspond to the virtual master image data is executed. Alternatively, if image data of a new master image is generated by immediately recently executing a process of S108 to be described later, a process for generating the retention data 61 by making ID information, which is generated along with the image data of the new master image when the process of S108 is executed, correspond to the image data of the new master image is executed.

The above described processes are the difference data generation process of S106.

In the process of S106, a data compression process may be executed for the generated difference data, and a process for generating the retention data 61 by making the ID information correspond to the difference data for which the compression process has been executed, and for storing the data in the difference data storing unit 220 may be executed.

Next, in S107, a process for obtaining a data size of the retention data 61 generated with the process of S106, and for determining whether or not the data size is equal to or larger than a predetermined threshold value is executed. This determination process is a process executed by the form classification processing unit 130 in the configuration of FIG. 3. If it is determined in this determination process that the data size is equal to or larger than the predetermined threshold value, the flow goes to S108. Alternatively, if it is determined that the data size is smaller than the predetermined threshold value, the flow goes to S109.

In S108, a process for generating new master image data 92 is executed. In the configuration of FIG. 3, this process is a process executed by the virtual master image data automatic generation processing unit 170 and the master image data generation processing unit 120.

In the process of S108, a process for generating ID information for identifying the scan data 51 used to generate the difference data in the process of S106 from other master image data is executed. Next, a process for generating the new master image data from the scan data 51 is executed. Then, a process for storing the newly generated master image data 92 and the ID information in the master image storing unit 110 is executed.

The above described processes are the new master image data generation process of S108.

Next, in S109, a process for transmitting the retention data 61 that is generated by most recently executing the process of S106 and includes the difference data and the ID information to the storage device 200, and for storing the retention data 61 in the difference data storing unit 220 is executed. Upon completion of this process, the form image storage control process of FIG. 4 is terminated.

The MPU 81 executes the above described form image storage control process, whereby the computer 80 of FIG. 2 operates as the scan terminal device 100, and can generate data for retention of an image of a form, and can retain the generated data in the storage device 200.

Figure 5:
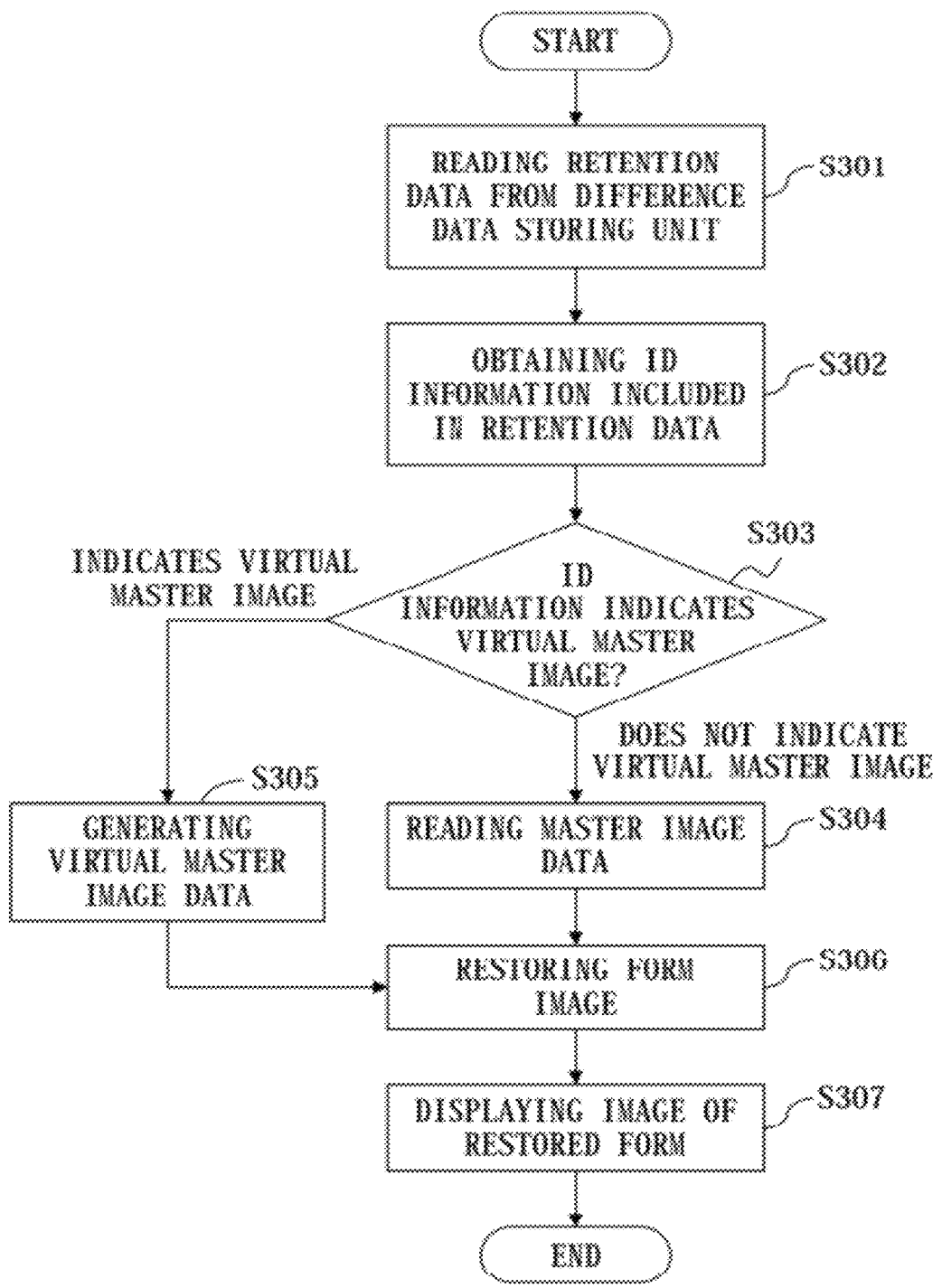
FIG. 5 is a flowchart illustrating contents of a first example of a form image display control process.

FIG. 5 is described next. FIG. 5 is a flowchart illustrating contents of a first example of a form image display control process executed by the MPU 81 when the computer 80 of FIG. 2 is used as the display terminal device 300 in the form image managing system 1 of FIG. 1.

The process of FIG. 5 is started when the MPU 81 detects that a user of the display terminal device 300 has input information for specifying an image of a form to be displayed and a predetermined process start instruction via the input device 85. The process of FIG. 5 assumes that master image data 92 is read from the master image storing unit 310 if the master image data 92 is used.

Processes in S301 to S304, S306 and S307 in FIG. 5 are processes executed by the display image data generation processing unit 150 in the configuration of FIG. 3. In contrast, a process in S305 is a process executed by the virtual master image data automatic generation processing unit 170 in the configuration of FIG. 3.

In FIG. 5, initially in S301, a process for reading retention data 61 identified with the information for specifying the image of the form to be displayed, which has been input by the user of the display terminal device 300, by referencing the difference data storing unit 220 of the storage device 200 is executed. If a data compression process has been executed for difference data included in the read retention data 61, original difference data is restored by executing a data decompression process for the difference data.

Next, in S302, a process for extracting ID information included in the retention data 61 from the retention data 61 that has been read from the difference data storing unit 220 by executing the process of S301 is executed.

Then, in S303, a process for determining whether or not the ID information obtained by executing the process of S302 indicates virtual master image data is executed. Here, if it is determined that the ID information indicates the virtual master image data, the flow goes to S305. Alternatively, if it is determined that the ID information indicates normal master image data (namely, not virtual master image data), the flow goes to S304.

In S304, a process for reading, from the master image storing unit 310, the master image data 92 identified with the ID information included in the retention data 61 that is obtained by executing the process of S302 is executed. Upon completion of the process of S304, the flow goes to S306.

In S305, a process for similarly generating the same virtual master image data as that generated by executing the above described process of S105 in FIG. 4 is executed. Upon completion of the process of S305, the flow goes to S306.

Next, a process for restoring display image data 71 that represents the image of the form specified by the user of the display terminal device 300 is executed. Specifically, this process is executed as follows.

Initially, a process for generating the same prediction image as that generated with the motion compensation inter-frame prediction process executed at the time of the above described difference data generation process in S106 of FIG. 4 is executed. This prediction image can be generated by using the master image data 92 obtained by executing the process of S304, and motion vector information within the difference data included in the retention data 61 read by executing the process of S301. However, if virtual master image data has been generated by executing the process of S305, the process for generating the prediction image is executed by using the virtual master image data as a replacement for the master image data 92.

Next, a process for adding, to the generated prediction image, a prediction error represented by motion compensation inter-frame prediction error information included in the difference data within the retention data 61 read by executing the process of S301 is executed.

With the above described processes, the display image data 71 is restored.

Next, in S307, a process for causing the display device 86 included in the display terminal device 300 to display the image of the original form represented with the display image data 71 restored by executing the process of S306 is executed. Upon completion of this process, the form image display control process of FIG. 5 is terminated.

The MPU 81 executes the above described form image display control process, whereby the computer 80 of FIG. 2 operates as the display terminal device 300, and can read data retained in the storage device 200 and can display an image of an original form represented with the data.

Figure 6:
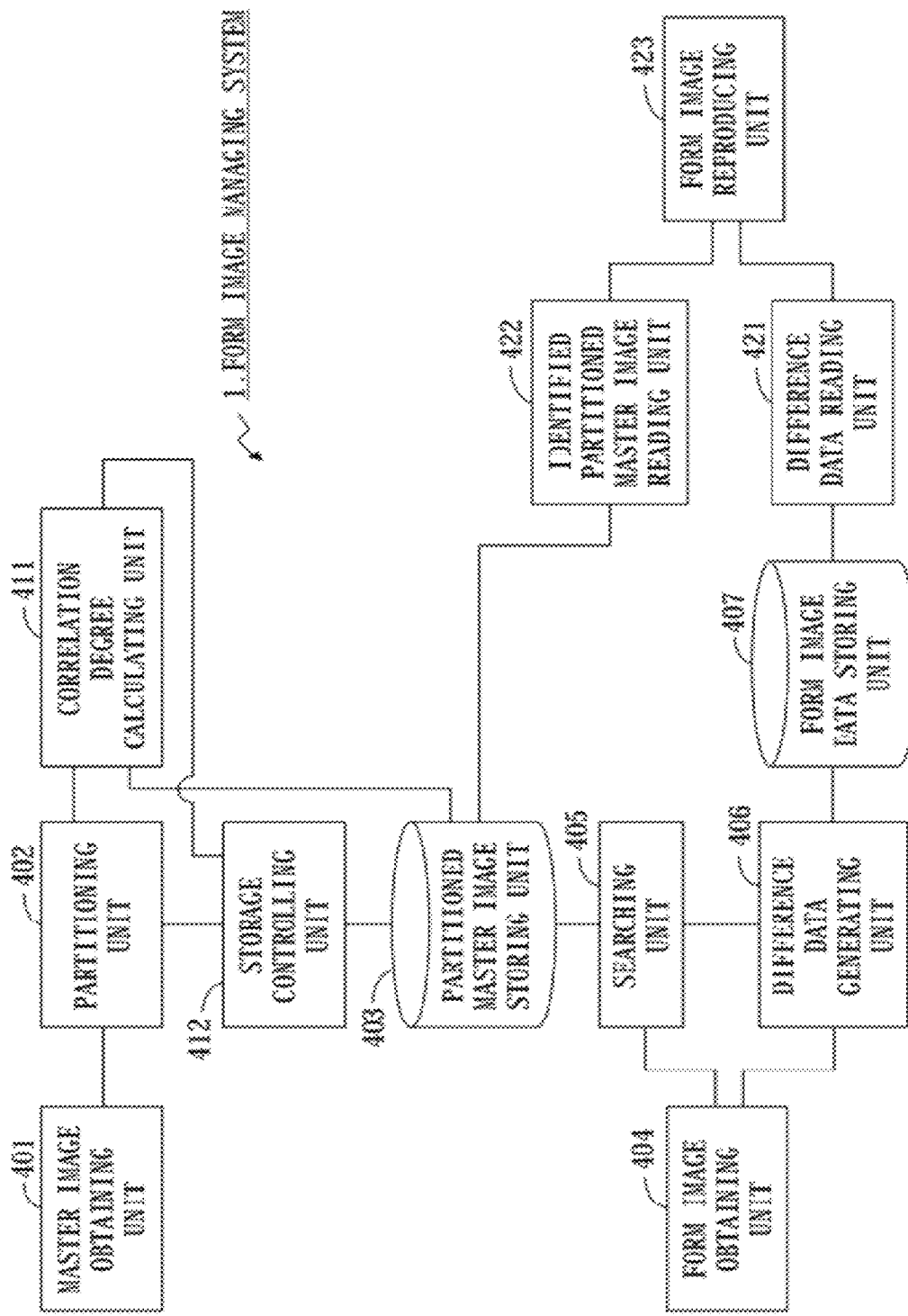
FIG. 6 illustrates function blocks of another embodiment of the form image managing system.

FIG. 6 is described next. FIG. 6 illustrates function blocks of another embodiment of the form image managing system.

The form image managing system 1 includes a master image obtaining unit 401, a partitioning unit 402, a partitioned master image storing unit 403, a form image obtaining unit 404, a searching unit 405, a difference data generating unit 406 and a form image data storing unit 407.

The master image obtaining unit 401 obtains a master image from an image reading device such as an image scanner device or the like. In this embodiment, a master image is an image of a form where an image of a predetermined style is printed in advance before information is added by being hand-written, stamped, printed or the like.

The partitioning unit 402 partitions the master image obtained by the master image obtaining unit 401.

The partitioned master image storing unit 403 stores partitioned images into which the master image is partitioned by the partitioning unit 402 as partitioned master images.

The form image obtaining unit 404 obtains an image of the form after information has been added by being hand-written, stamped, printed or the like from the image reading device such as the image scanner device or the like. The image obtained by the form image obtaining unit 404 is hereinafter referred to as a "written form image" in the subsequent description.

The searching unit 405 searches the partitioned master image storing unit 403 for a partitioned master image having a high correlation (the maximum positive correlation) for each of a plurality of partial images obtained by partitioning the written form image.

The difference data generating unit 406 generates difference data of each of the partial images from the above described partitioned master image having the high correlation with the partial image.

The form image data storing unit 407 stores identification information for identifying the partitioned master image having the high correlation with the partial image and the difference data generated by the difference data generating unit 406 as form image data that represents the written form image. In the form image data storing unit 407, the identification information and the difference data are stored by being made to correspond to each of the plurality of partial images obtained by partitioning the written form image.

In the form image managing system 1 of FIG. 6 having the above described function blocks, a partitioned master image having a high correlation with a partial image of a written form image obtained by the form image obtaining unit 404 is selected from among a plurality of types of partitioned master images stored in the partitioned master image storing unit 403. Then, difference data of the partial image of the written form image from the selected partitioned master image is generated, and stored and retained in the form image data storing unit 407. Namely, with the form image managing system 1 of FIG. 6, a master image having a high correlation with a written form image to be retained is selected as difference data to be generated, and only a portion different from the master image is extracted as difference data, thereby reducing the amount of data to be retained.

Incidentally, for example, there are not a few cases where even forms of different types partially adopt a common style such as a name section, an address section and the like. There are also cases where, for example, a form is newly created by changing only a description text printed in a partial area of a conventionally used form and by leaving a conventional style unchanged in the rest of the partial area. Partitioned master images in areas where a common style is printed in such separate forms are the same image among the forms.

In the form image managing system 1 having the configuration of FIG. 6, partitioned master images obtained by partitioning a master image of a form are stored in the partitioned master image storing unit 403. Accordingly, among forms of different types including an area where a common style is printed as described above, a partitioned master image of the above described area can be shared when difference data is generated. A partitioned master image is shared among forms of different types in this way, whereby also the amount of data that is indirectly needed to retain data of a written form image and retained in the partitioned master image storing unit 403 can be reduced.

Note that the form image managing system 1 may further include a correlation degree calculating unit 411 and a storage controlling unit 412 as illustrated in FIG. 6.

The correlation degree calculating unit 411 calculates the degree of correlation (the above described mutual correlation coefficient) between one partitioned master image obtained by partitioning the above described master image and each of a plurality of partitioned master images stored in the partitioned master image storing unit 403.

The storage controlling unit 412 performs a control for storing the above described one partitioned master image in the partitioned master image storing unit 403 if the degree of correlation (a coefficient indicating the maximum positive correlation) is lower than a predetermined value.

The form image managing system 1 including the correlation degree calculating unit 411 and the storage controlling unit 412 can prevent the same partitioned master image as that already stored in the partitioned master image storing unit 403 from being redundantly stored in the partitioned master image storing unit 403. Accordingly, the amount of data that is indirectly needed to retain data of written form images and stored in the partitioned master image storing unit 403 can be reduced.

In the form image managing system 1 of FIG. 6, the difference data generating unit 406 may perform, for the above described partial image, motion compensation inter-frame prediction based on a partitioned image having a high correlation with the partial image. In this case, the difference data generating unit 406 generates motion vector information and motion compensation inter-frame prediction error information of the partial image from the partitioned master image as the above described difference data. As a result, the amount of generated difference data can be prevented from increasing even if there is a slight shift between a position of the partial image of the written form image obtained by the form image obtaining unit 404 and that of the partitioned master image.

Note that the difference data generating unit 406 may further execute a data compression process for the generated difference data in the form image managing system 1 of FIG. 6. In this case, the form image data storing unit 407 stores the difference data for which the difference data generating unit 406 has executed the data compression process. As a result, the amount of difference data to be retained in the form image data storing unit 407 is further reduced.

Alternatively, in the determination of a correlation between a partitioned master image stored in the partitioned master image storing unit 403 and a partial image of a form image obtained by the form image obtaining unit 404, a partitioned master image having the smallest difference to the partial image among a plurality of the partitioned master images may treat as the partitioned master image having a coefficient indicating the maximum positive correlation with the partial image.

To restore an original written form image from the data stored in the form image data storing unit 407, the form image managing system 1 may further include a difference data reading unit 421, an identified partitioned master image reading unit 422 and a form image reproducing unit 423 as illustrated in FIG. 6.

The difference data reading unit 421 reads the above described difference data and the above described identification information made to correspond to the difference data from the form image data storing unit 407.

The identified partitioned master image reading unit 422 reads, from the partitioned master image storing unit 403, a partitioned master image identified with the identification information read by the difference data reading unit 421.

The form image reproducing unit 423 initially restores each of the above described plurality of partial images from the difference data read by the difference data reading unit 421 and the partitioned master image read by the identified partitioned master image reading unit 422. Then, the form image reproducing unit 423 restores the image of the form obtained by the form image obtaining unit 404 by merging the restored partial images.

For example, if the difference data generating unit 406 generates motion vector information and motion compensation inter-frame prediction error information as difference data by performing motion compensation inter-frame prediction as described above, the form image reproducing unit 423 performs the following operations.

Namely, in this case, the form image reproducing unit 423 initially generates a prediction image by using the partitioned master image read by the identified partitioned master image reading unit 422 and the motion vector information included in the difference data read by the difference data reading unit 421. Next, the form image reproducing unit 423 adds a prediction error to the generated prediction image by using the motion compensation inter-frame prediction error information included in the difference data. As a result, a partial image of the written form image is restored. Thereafter, the form image reproducing unit 423 reproduces the written form image obtained by the form image obtaining unit 404 by merging a plurality of restored partial images.

Also the function blocks of the form image managing system 1 illustrated in FIG. 6 can be configured by using the computer 80 having the configuration illustrated in FIG. 2. To configure the form image managing system 1 by using the computer 80, for example, a control program for causing the MPU 81 to execute various types of control processes to be described later is created. With the control program, for example, the hard disk device 84 is caused to function as the partitioned master image storing unit 403 and the form image data storing unit 407. Moreover, the interface device 87 to which an image reading device such as an image scanner device or the like is connected is caused to function as the master image obtaining unit 401 and the form image obtaining unit 404. The created control program is pre-stored in the hard disk device 84 or on the portable recording medium 90, and a predetermined instruction is given to the MPU 81, which is caused to read and execute the control program. As a result, the functions respectively possessed by the function blocks of the form image managing system 1 illustrated in FIG. 6 are provided by the MPU 81, so that the computer 80 functions as the form image managing system 1.

Figure 7:
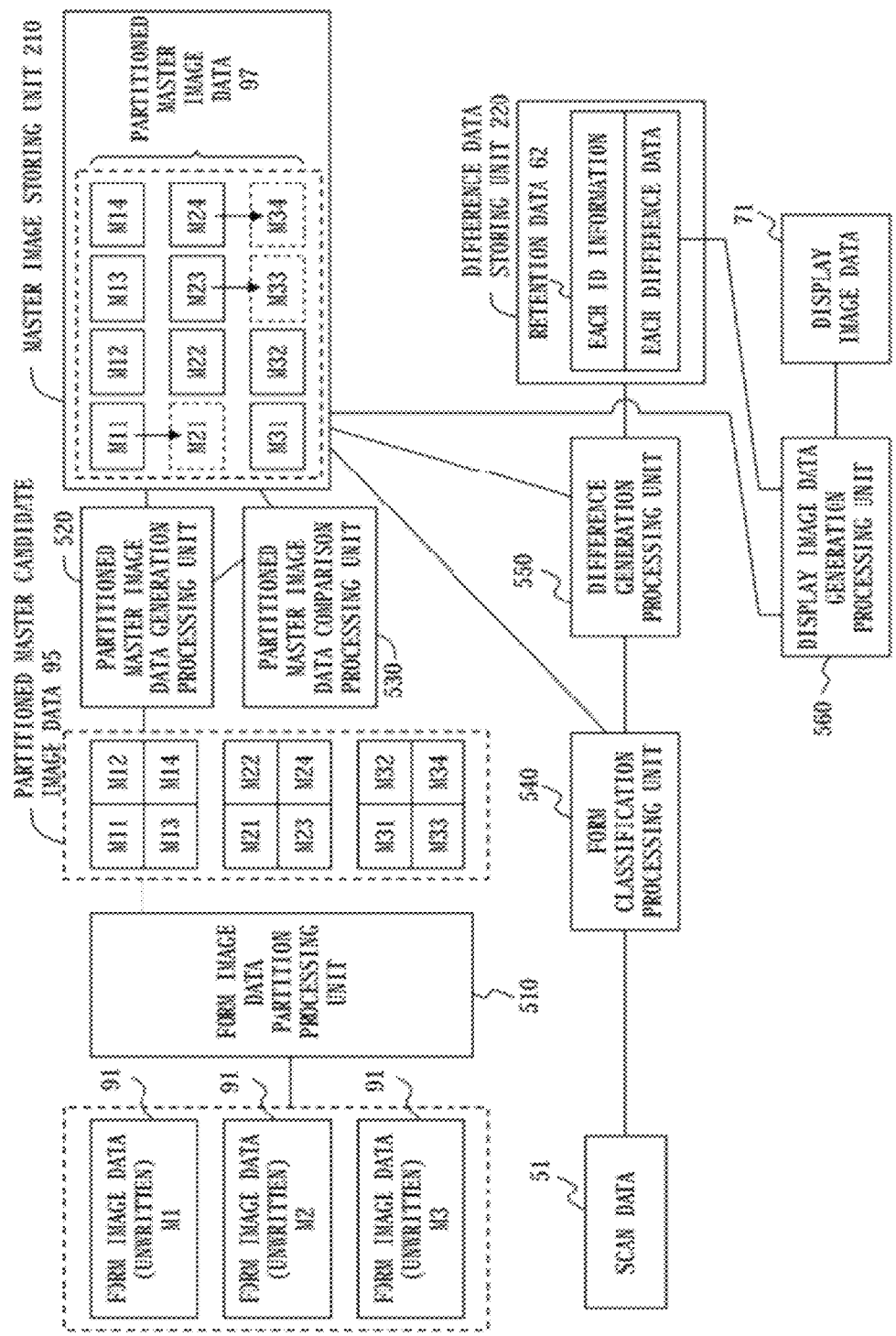
FIG. 7 illustrates a second example of details of a function block configuration of the form image managing system of FIG. 1.

FIG. 7 is described next. FIG. 7 illustrates a second example of details of the function block configuration of the form image managing system 1 illustrated in FIG. 1. The second example is intended to implement the form image managing system 1 illustrated in FIG. 6 by using the form image managing system 1 of FIG. 1. Functions of these function blocks can be provided by the computer 80 having the configuration of FIG. 2.

Similarly to FIG. 3, the master image storing units 110, 210 and 310 that store identical master image data and information for identifying each master image are generically referred to as the "master image storing unit 210" as described above for ease of explanation also in FIG. 7.

The computer 80 provides the functions of a form image data partition processing unit 510, a partitioned master image data generation processing unit 520, a partitioned master image data comparison processing unit 530, a form classification processing unit 540, a difference generation processing unit 550 and a display image data generation processing unit 560. In this embodiment, the form image data partition processing unit 510, the partitioned master image data generation processing unit 520, the partitioned master image data comparison processing unit 530, the form classification processing unit 540 and the difference generation processing unit 550 are included in the scan terminal device 100 of FIG. 1. The display image data generation processing unit 560 is included in the display terminal device 300 of FIG. 1.

The form image data partition processing unit 510 provides a function equivalent to the partitioning unit 402 of FIG. 6. Namely, the form image data partition processing unit 510 initially executes a process for obtaining a plurality of partitioned images (partitioned master candidate images) by partitioning an image of a form when data (form image data 91) of the image of the (unwritten) form before information is added by being handwritten or the like. Then, the form image data partition processing unit 510 executes a process for outputting data (partitioned master candidate image data 95) that represents the partitioned master candidate images.

The partitioned master image data generation processing unit 520 executes a process for storing the partitioned master candidate image data 95 in the master image storing unit 210 as partitioned master image data 97 along with identification information (ID information) of each image and size information of the image. The master image storing unit 210 is equivalent to the partitioned master image storing unit 403 of FIG. 6.

The partitioned master image data comparison processing unit 530 initially executes a process for calculating, for each of the partitioned master candidate images, the degree of correlation between the partitioned master candidate image and a partitioned master image represented with each piece of the entire partitioned master image data 97 stored in the master image storing unit 210. If determining that the degree of correlation calculated for one partitioned master candidate image is lower than a predetermined value, the partitioned master image data comparison processing unit 530 executes a process for controlling the partitioned master image data generation processing unit 520 to store the one partitioned master candidate image in the master image storing unit 210. Alternatively, if determining that the degree of correlation calculated for the one partitioned master candidate image is equal to or higher than the predetermined value, this image is not stored in the master image storing unit 210.

Contents of the process executed by the partitioned master image data comparison processing unit 530 are further described with an image example of FIG. 7.

FIG. 7 illustrates form image data 91 of form images M1, M2 and M3 as one example, and also illustrates respective pieces of partitioned master candidate image data 95 of partitioned master candidate images M11 to M14, M21 to M24 and M31 to M34. Here, the partitioned master candidate images M11 to M14 are images obtained by partitioning the form image M1, the partitioned master candidate images M21 to M24 are images obtained by partitioning the form image M2, and the partitioned master candidate images M31 to M34 are images obtained by partitioning the form image M3.

The partitioned master image data comparison processing unit 530 initially calculates the degree of correlation between the partitioned master candidate image M1 and a partitioned master image the partitioned master image data 97 of which is stored in the master image storing unit 210. At this time, however, the partitioned master image data 97 has not been stored yet in the master image storing unit 210. In this case, the partitioned master image data comparison processing unit 530 controls the partitioned master image data generation processing unit 520 to store the partitioned master candidate image data 95 of the partitioned master candidate image M11 in the master image storing unit 210 as the partitioned master image data 97.

Next, the partitioned master image data comparison processing unit 530 calculates the degree of correlation between the partitioned master candidate image M12 and a partitioned master image the partitioned master image data 97 of which is stored in the master image storing unit 210. At this time, the partitioned master image data 97 of the partitioned master image M11 is stored in the master image storing unit 210. Therefore, the partitioned master image data comparison processing unit 530 calculates the degree of correlation between the partitioned master candidate image M12 and the partitioned master image M11. The example of FIG. 7 assumes that the degree of correlation is lower than a predetermined value. Accordingly, in this case, the partitioned master image data comparison processing unit 530 controls the partitioned master image data generation processing unit 520 to store the partitioned master candidate image data 95 of the partitioned master candidate image M12 in the master image storing unit 210 as the partitioned master image data 97.

Next, the partitioned master image data comparison processing unit 530 calculates the degree of correlation between the partitioned master candidate image M13 and a partitioned master image the partitioned master image data 97 of which is stored in the master image storing unit 210. At this time, the partitioned master image data 97 of the partitioned master images M11 and M12 are stored in the master image storing unit 210. Therefore, the partitioned master image data comparison processing unit 530 calculates the degree of correlation between the partitioned master candidate image M13 and each of the partitioned master images M11 and M12. The example of FIG. 7 assumes that both of the degrees of correlation between the partitioned master candidate image M13 and the partitioned master images M11 and M12 are lower than the predetermined value. Accordingly, in this case, the partitioned master image data comparison processing unit 530 controls the partitioned master image data generation processing unit 520 to store the partitioned master candidate image data 95 of the partitioned master candidate image M13 in the master image storing unit 210 as the partitioned master image data 97.

Also the case of the next partitioned master candidate image M14 is similar. Namely, the partitioned master candidate image data 95 of the partitioned master candidate image M14 is stored in the master image storing unit 210 as the partitioned master image data 97.

Next, the partitioned master image data comparison processing unit 530 calculates the degree of correlation between the partitioned master candidate image M21 and each of the partitioned master images M11 to M14. The example of FIG. 7 assumes that the degree of correlation with the partitioned master image M11 is the highest among the calculated degrees of correlation and is higher than the predetermined value. Accordingly, in this case, the partitioned master image data comparison processing unit 530 controls the partitioned master image data generation processing unit 520 not to store the partitioned master candidate image data 95 of the partitioned master candidate image M21 in the master image storing unit 210.

For the subsequent partitioned master candidate images M22 to M32, the partitioned master image data comparison processing unit 530 calculates their degrees of correlation with the partitioned master images, the partitioned master image data 97 of which are stored in the master image storing unit 210, and all the calculated degrees are lower than the predetermined value. Accordingly, the partitioned master image data comparison processing unit 530 controls the partitioned master image data generation processing unit 520 to store the partitioned master candidate image data 95 of the partitioned master candidate images M22 to M32 in the master image storing unit 210 the as partitioned master image data 97.

Next, the partitioned master image data comparison processing unit 530 calculates the degree of correlation between the partitioned master candidate image M33 and each of the partitioned master images M11 to M32. The example of FIG. 7 assumes that the degree of correlation with the partitioned master image M23 is the highest among the calculated degrees of correlation and higher than the predetermined value. Accordingly, in this case, the partitioned master image data comparison processing unit 530 controls the partitioned master image data generation processing unit 520 not to store the partitioned master candidate image data 95 of the partitioned master candidate image M33 in the master image storing unit 210.

Also the case of the next partitioned master candidate image M34 is similar. The example of FIG. 7 assumes that the degree of correlation with the partitioned master image M24 is the highest among calculated degrees of correlation and is higher than the predetermined value. Accordingly, in this case, the partitioned master image data comparison processing unit 530 controls the partitioned master image data generation processing unit 520 not to store the partitioned master candidate image data 95 of the partitioned master candidate image M34 in the master image storing unit 210.

The partitioned master image data comparison processing unit 530 executes the above described processes. As a result, the partitioned master candidate image data 95 of the partitioned master candidate images M21, M33 and M34 having a significantly high correlation with the partitioned master images M11, M23 and M24 are prevented from being stored in the master image storing unit 210. In consequence, the amount of partitioned master image data 97 retained in the master image storing unit 210 is reduced.

The example of FIG. 7 depicts that the sizes of the partitioned master candidate images M11 to M34 into which the form image data partition processing unit 510 respectively partitions the form images M1 to M3 are the same. However, these sizes may not be the same.

The form classification processing unit 540 is a processing unit equivalent to the form classification processing unit 101 of FIG. 1. Processes executed by the form classification processing unit 540 are described with reference to FIG. 8.

Initially, the form classification processing unit 540 executes a process for obtaining scan data 51 that represents an image of a form (written form image) output from the scanner device 50 after information has been added by being handwritten or the like.

Figure 8:
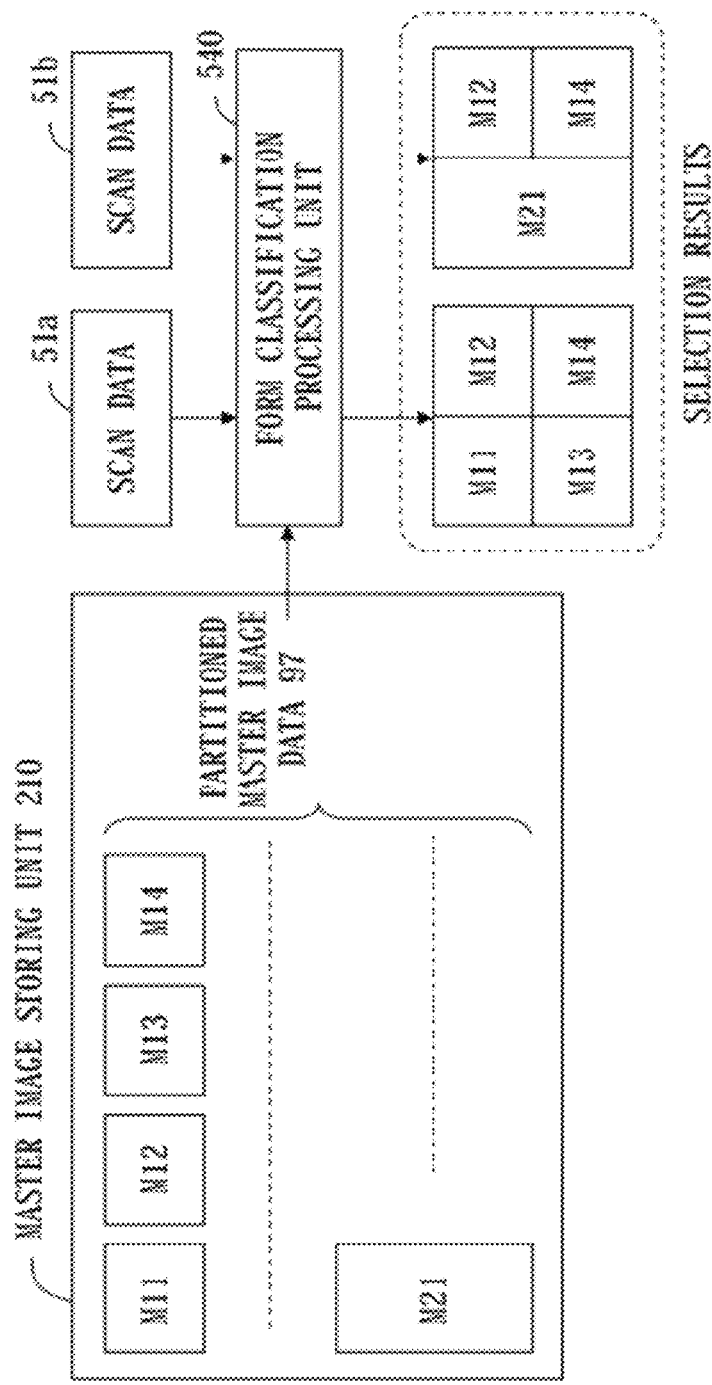
FIG. 8 is an explanatory view of a process executed by a form classification processing unit of FIG. 7.

The example of FIG. 8 depicts that scan data 51a and 51b of two types of written form images are obtained by the form classification processing unit 540.

Next, the form classification processing unit 540 executes a process for selecting a partitioned master image most similar to a partial image of the written form image, which is represented with the scan data 51, from among partitioned master images the partitioned master image data 97 of which are stored in the master image storing unit 210. More specifically, the form classification processing unit 540 executes a process for calculating a mutual correlation coefficient between a partitioned master image and a partial image of the written form image for an array that represents values of pixels that configure the image. Next, the form classification processing unit 540 executes a process for selecting partitioned master image data 97 of a partitioned master image by which a coefficient that indicates the maximum positive correlation is obtained in the mutual correlation coefficient calculation process.

The example of FIG. 8 depicts that the partitioned master images M11, M12, M13 and M14 are selected by the form classification processing unit 540 as images most similar to the partial images of the written form image represented with the scan data 51a. In this example, the partitioned master image M11 is an image most similar to an upper left partial image of the form image, and the partitioned master images M12, M13 and M14 are respectively images most similar to upper right, lower left and lower right partial images of the form image. Accordingly, an image where the partitioned master images M11, M12, M13 and M14 are arranged according to arrangement positions of the partial images of the written form image results in an image that is extremely similar to the written form image represented with the scan data 51a.

The example of FIG. 8 also depicts that the partitioned master images M21, M12 and M14 are selected by the form classification processing unit 540 as respective images most similar to partial images of the written form image represented with the scan data 51b. In this example, the partitioned master image M21 is an image most similar to a left partial image of the written form image, and the partitioned master images M12 and M14 are respectively images most similar to upper right and lower right partial images of the written form image. Accordingly, an image where the partitioned master images M21, M12 and M14 are arranged according to arrangement positions of the partial images of the written form image results in an image that is extremely similar to the written form image represented with the scan data 51b.

As described above, the example of FIG. 8 depicts that the partitioned master images M12 and M14 are selected also in the two types of the written form images that are respectively represented with the scan data 51a and 51b.

After the above described process, the form classification processing unit 540 executes a process for obtaining ID information of the selected partitioned master image data 97 from the master image storing unit 210, and for transmitting the obtained ID information to the difference generation processing unit 550. At this time, the form classification processing unit 540 also transmits coordinates information that represents an arrangement position of each of the partitioned master images when the selected partitioned master images are arranged according to the written form image.

The difference generation processing unit 550 is a processing unit equivalent to the difference generation processing unit 102 of FIG. 1. Processes executed by the difference generation processing unit 550 are described with reference to FIG. 9.

Initially, the difference generation processing unit 550 executes a process for obtaining the same scan data 51 as that obtained by the form classification processing unit 540 from the scanner device 50.

Figure 9:
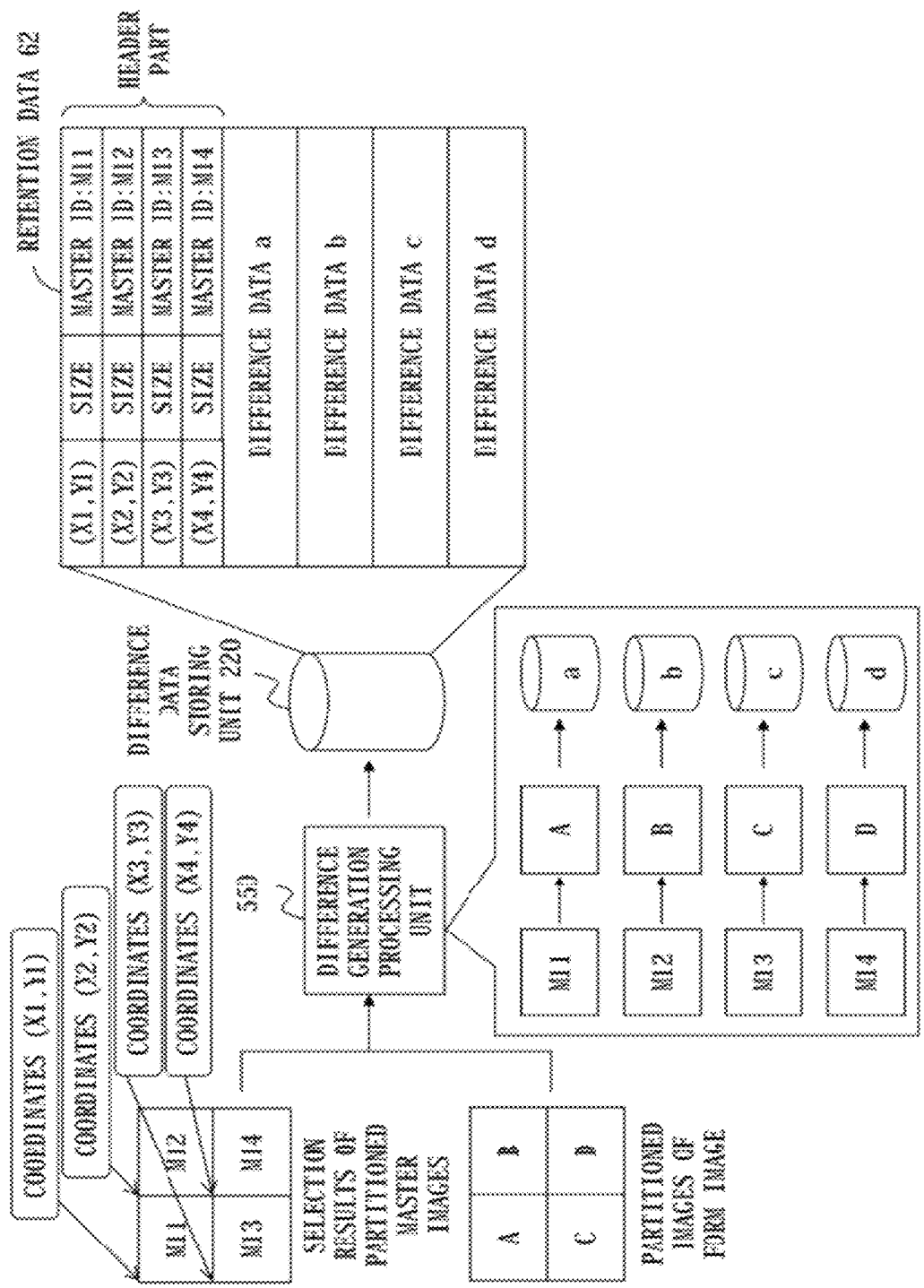
FIG. 9 is an explanatory view of a process executed by a difference generation processing unit of FIG. 7.

The example of FIG. 9 depicts that the difference generation processing unit 550 obtains an image of a form that is represented with the scan data 51 and composed of partial images A, B, C and D.

Additionally, the difference generation processing unit 550 executes a process for receiving ID information of a partitioned master image and coordinates information of an arrangement position of the partitioned master image, which are transmitted from the form classification processing unit 540. Then, the difference generation processing unit 550 executes a process for reading, from the master image storing unit 210, partitioned master image data 97 corresponding to the ID information, and size information of the partitioned master image.

The example of FIG. 9 depicts that the difference generation processing unit 550 obtains the partitioned master images M11, M12, M13 and M14 that are represented with the partitioned master image data 97 read from the master image storing unit 210. Here, assume that the difference generation processing unit 550 obtains coordinates (X1,Y1), (X2,Y2), (X3,Y3) and (X4,Y4) of vertexes at upper left corners of the images as coordinates of arrangement positions of the partitioned master images M11, M12, M13 and M14.

Next, the difference generation processing unit 550 executes a process for generating difference data of a partial image of the written form image, which the form classification processing unit 540 uses to select a partitioned master image, from the partitioned master image represented with the partitioned master image data 97. Specifically, this process is executed as follows.

The difference generation processing unit 550 initially executes, for the partial image, a motion compensation inter-frame prediction process based on the partitioned master image represented with the partitioned master image data 97. The motion compensation inter-frame prediction process is a process similar to that executed by the difference generation processing unit 140 in the first example of FIG. 3. Then, the difference generation processing unit 140 executes a process for generating motion vector information and motion compensation inter-frame prediction error information, which are obtained with the motion compensation inter-frame prediction process, as the difference data of the above described partial image of the written form image from the above described partitioned master image.

The example of FIG. 9 depicts that the difference generation processing unit 550 generates difference data a of the partial image A from the partitioned master image M11. The example of FIG. 9 also depicts that the difference generation processing unit 550 generates difference data b, c and d of the partial images B, C and D respectively from the partitioned master images M12, M13 and M14.

Next, the difference generation processing unit 550 executes a process for generating retention data 62 by making ID information and size information of the partitioned master images selected by the form classification processing unit 540 correspond to the generated difference data. Then, the difference generation processing unit 550 executes a process for transmitting the generated retention data 62 to the storage device 200, and for storing the retention data 62 in the difference data storing unit 220. The retention data 62 is equivalent to the retention data 61 of FIG. 1. However, since their data structures are different, the description is provided by assuming the retention data "62".

FIG. 9 also illustrates the data structure of the retention data 62. In the example of FIG. 9, the retention data 62 includes four pieces of the difference data a, b, c and d, which are generated for the original written form image. Moreover, the retention data 62 is provided with a header part. This header part includes the above described coordinates information of an arrangement position, image size information and ID information (master ID) of each of the four partitioned master images M11, M12, M13 and M14, which the difference generation processing unit 550 uses to generate the difference data.

Note that the difference generation processing unit 550 may execute a data compression process for the generated difference data, and may further execute a process for generating the retention data 62 by adding the header part including the above described information to the difference data for which the data compression process has been executed, and for storing the data in the difference data storing unit 220. A compression method and a data compression rate of the data compression process are arbitrarily selected. In this embodiment, however, it is preferable to select the compression method and the data compress rate by considering that a later reproduced image of the written form image should have an image quality level sufficiently available as trail information.

Referring the description backs to FIG. 7.

The display image data generation processing unit 560 executes the following processes.

Initially, the display image data generation processing unit 560 executes a process for reading, from the difference data storing unit 220, retention data 62 identified with an instruction by referencing the difference data storing unit 220 of the storage device 200 upon receiving an input of the predetermined instruction from a user of the system. If the data compression process has been executed for difference data included in the read retention data 62, original difference data is restored by executing a data decompression process for the difference data.

Next, the display image data generation processing unit 560 executes a process for reading, from the master image storing unit 210, partitioned master image data 97 identified with ID information included in the retention data 62 read form the difference data storing unit 220.

Next, the display image data generation processing unit 560 executes a process for restoring partial images of the original written form image from the difference data included in the read retention data 62, and the partitioned master image data 97 read from the master image storing unit 210. Specifically, this process is executed as follows.

Initially, the display image data generation processing unit 560 executes a process for generating the same prediction image as that generated in the motion compensation inter-frame prediction process executed by the difference generation processing unit 550. This prediction image can be generated by using the partitioned master image data 97 read from the master image storing unit 210, and motion vector information within the difference data included in the read retention data 62.

Next, the display image data generation processing unit 560 executes a process for adding, to the generated prediction image, a prediction error represented by motion compensation inter-frame prediction error information included in the difference data within the read retention data 62. With this process, partial images of the original written form image are restored.

Then, the display image data generation processing unit 560 executes a process for reproducing the original written form image (the form image represented with the scan data 51) by merging the restored partial images, and for generating display image data 71 that represents the original written form image.

Next, the display image data generation processing unit 560 executes a process for causing the display device 86 included in the display terminal device 300 to display the reproduced image, which is represented with the display image data 71 obtained as described above, of the form image represented with the scan data 51.

The function blocks of the form image managing system 1 illustrated in FIG. 7 respectively provide the above described functions.

FIG. 10 is described next. FIG. 10 is a flowchart illustrating contents of a partitioned master image storage control process executed by the MPU 81 when the computer 80 of FIG. 2 is used as the scan terminal device 100 in the form image managing system 1 illustrated in FIG. 1.

If partitioned master image data 97 is used, the partitioned master image data 97 is assumed to be read from the master image storing unit 110 in the process of FIG. 10. Moreover, in the process of FIG. 10, the partitioned master image data 97 is also stored in the other master image storing units 210 and 310 the same time the partitioned master image data 97 is stored in the master image storing unit 110.

The process of FIG. 10 is started when the scanner device 50 obtains form image data 91 that represents an image of a form (unwritten form image) by scanning the form on which the image of a predetermined style is printed in advance before information is added by being hand-written, stamped, printed or the like.

In FIG. 10, processes in S501 to S503 are processes executed by the form image data partition processing unit 510 in the configuration of FIG. 7.

Initially, in S501, a process for obtaining the form image data 91 that is output from the scanner device 50 and represents the above described unwritten form image is executed.

Next, in S502, a process for obtaining an instruction, input by a user of the scan terminal device 100 via the input device 85, of a method for partitioning the unwritten form image is executed. Examples of the instruction of the method include various instructions such as an instruction to halve the unwritten form image shaped like a rectangle into right and left portions, an instruction to further halve only the right portion into upper and lower portions, an instruction to vertically and horizontally halve the unwritten form image shaped like the rectangle into respective two portions, and the like.

Next, in S503, a process for partitioning the unwritten form image according to the instruction obtained with the process of S502, and for temporarily storing the partitioned images in the RAM 83 is executed. The partitioned images obtained by partitioning the unwritten form image with this process are partitioned master candidate images. In the following description, each of the partitioned master candidate images is assumed to be a partitioned master candidate image Dn by using a variable n.

A process in S508 among subsequent processes in S504 to S510 is a process executed by the partitioned master image data generation processing unit 520 in the configuration of FIG. 7, and the other processes are executed by the partitioned master image data comparison processing unit 530 in the configuration of FIG. 7.

Initially, in S504, a process for substituting an initial value "1" to the variable n is executed.

Next, in S505, a process for referencing the partitioned master candidate image Dn stored in the RAM 83 is executed. In the subsequent S506, a process for calculating the degree of correlation between the partitioned master candidate image Dn and each of partitioned master images represented with the partitioned master image data 97 stored in the master image storing unit 110 is executed.

Next, in S507, a process for determining whether or not a degree of correlation equal to or higher than a predetermined value exists among the degrees of correlation, which are calculated with the process of S506, is executed. Here, if it is determined that the degree of correlation equal to or higher than the predetermined value exists (the determination results in "YES"), the partitioned master candidate image Dn is not stored in the master image storing unit 110, and the flow goes to S509 without executing any processes. Alternatively, if it is determined that all the degrees of correlation are lower than the predetermined value (the determination results in "NO"), the flow goes to S508, in which a process for storing image data of the partitioned master candidate image Dn in the master image storing unit 110 as partitioned master image data 97 is executed.

Next, a process for incrementing the value of the variable n by 1 is executed.

Then, a process for determining whether or not the value of the variable n exceeds a total number of partitioned master candidate images obtained with the process of S503 is executed. Here, if it is determined that the value of the variable n exceeds the total number of partitioned master candidate images (the determination results in "YES"), this partitioned master image storage control process is terminated. Alternatively, if it is determined that the value of the variable n is equal to or smaller than the total number of partitioned master candidate images (the determination results in "NO"), the flow goes back to S505, and the above described processes are repeated.

The MPU 81 executes the above described partitioned master image storage control process, whereby the computer 80 of FIG. 2 operates as the scan terminal device 100, which stores partitioned master images in the master image storing unit 110.

Figure 11:
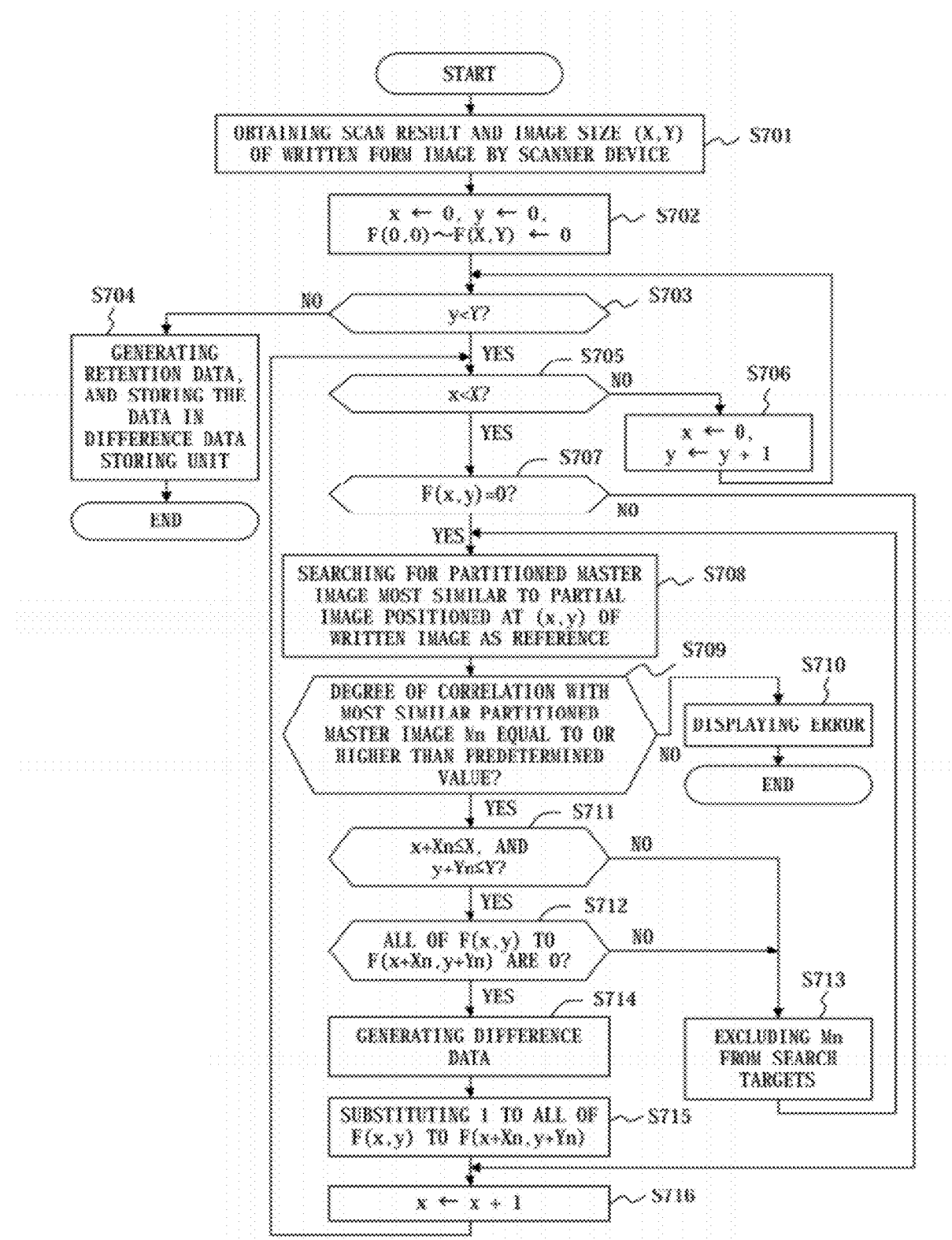
FIG. 11 is a flowchart illustrating contents of a second example of the form image storage control process.

FIG. 11 is described next. FIG. 11 is a flowchart illustrating contents of a second example of the form image storage control process executed by the MPU 81 when the computer 80 of FIG. 2 is used as the scan terminal device 100 in the form image managing system 1 illustrated in FIG. 1.

In the process of FIG. 11, assume that partitioned master image data 97 is read from the master image storing unit 110 if the partitioned master image data 97 is used.

The process of FIG. 11 is started when the scanner device 50 obtains scan data 51 that represents an image of a form (written form image) by scanning the form after information has been added by being hand-written, stamped, printed or the like. Here, assume that the written form image is shaped like a rectangle, and a width in a horizontal direction and a length in a vertical direction are X and Y, respectively. Also assume that orthogonal two-dimensional coordinates are defined in the written form image, and coordinates of four vertexes of the rectangle are (0,0), (X,0), (0,Y) and (X,Y), respectively.

In FIG. 11, processes in S704 and S714 among processes in S701 to S716 are processes executed by the difference generation processing unit 550 in the configuration of FIG. 7, and the other processes are executed by the form classification processing unit 540 in the configuration of FIG. 7.

Initially, in S701, a process for obtaining also image size information (the above described values of X and Y) of the written form image when obtaining the scan data 51 that is output from the scanner device 50 and represents the written form image is executed.

Next, in S702, a process for substituting an initial value "0" to variables x and y, and for setting all pieces of flag information F(0,0) to F(X,Y) to "0" is executed. Note that the flag information $F(x,y)$ ($0 \leq x < X$, $0 \leq y < Y$) is information for identifying whether or not difference data has been generated for a pixel arranged at a position (x,y) in the written form image. Value "0" indicates that the difference data has not been generated, whereas value "1" indicates that the difference data has been generated.

Next, in S703, a process for determining whether or not the value of the variable y is smaller than the above described Y is executed. If it is determined that the value of the variable y is smaller than Y (the determination results in "YES"), the flow goes to S705. Alternatively, if it is determined that the value of the variable y is equal to or larger than Y (the determination results in "NO"), the flow goes to S704.

The case where the determination in the process of S703 results in "NO" is a case where all pieces of difference data have been generated for the written form image. In S704, a process for generating retention data 62 by adding the information of the header part illustrated in FIG. 9 to the generated difference data, and for storing the data in the difference data storing unit 220 of the storage device 200 is executed. Upon completion of the process of S704, the form image storage control process is terminated.

In the meantime, in S705, a process for determining whether or not the value of the variable x is smaller than the above described X is executed. If it is determined that the value of the variable x is smaller than X (the determination results in "YES"), the flow goes to S707. Alternatively, if it is determined that the value of the variable x is equal to or larger than X, the flow goes to S706.

In S706, a process for substituting an initial value "0" to the variable x, and for incrementing the value of the variable y by "1" is executed. Then, the flow goes back to S703, and the above described processes are again executed.

In S707, a process for determining whether or not the flag information F(x,y) corresponding to the values of the variables x and y at this time is set to "0" is executed. If it is determined that F(x,y) is set to "0" (the determination results in "YES"), the flow goes to S708. Alternatively, if it is determined that F(x,y) is not set to "0" (namely, if F(x,y) is set to "1") (the determination results in "NO"), the flow goes to S716.

In S708, a process for searching the master image storing unit 110 for a partitioned master image most similar to the partial image arranged at the position (x,y) as a reference position in the written form image is executed.

In this process, a process for obtaining one partitioned master image from the master image storing unit 110 is initially executed. With this process, size information (a horizontal width Xa and a vertical length Ya of the partitioned master image shaped like a rectangle) of the obtained partitioned master image is also obtained. Then, a process for calculating, as the degree of correlation, a mutual correlation coefficient between an image (partial image) of a rectangular portion having diagonal points (x,y) and (Xa,Ya) in the written form image and the obtained partitioned master image is executed. The correlation degree calculation process is executed for all of partitioned master images the partitioned master image data 97 of which is stored in the master image storing unit 110. Then, a partitioned master image having a degree of correlation calculated to be high (the maximum positive correlation) is obtained as a search result.

In the subsequent description, the partitioned master image obtained with the search process of S708 is referred to as a most similar partitioned master image Mn. Moreover, assume that a horizontal width and a vertical length are respectively Xn and Yn as size information of the most similar partitioned master image Mn.

Next, in S709, a process for determining whether or not the degree of correlation, which is calculated for the most similar partitioned master image Mn, is equal to or higher than a predetermined value is executed. If it is determined that the degree of correlation is equal to or higher than the predetermined value (the determination results in "YES"), the flow goes to S711. Alternatively, if it is determined that the degree of correlation is lower than the predetermined value (the determination results in "NO"), the flow goes to S710.

In S710, a process for causing the display device 86 to make a predetermined error display indicating that a partitioned master image similar to the partial image in the written form image does not exist in the master image storing unit 110. Thereafter, the form image storage control process is terminated.

In S711, a process for determining whether or not x+Xn is equal to or smaller than X and whether or not y+Yn is equal to or smaller than Y is executed for the values of the variables x and y at this time. This process is a process for verifying that a partial image similar to the most similar partitioned master image Mn is an image included in the written form image. If it is determined that x+Xn is equal to or smaller than X and y+Yn is equal to or smaller than Y (the determination results in "YES"), the flow goes to S712. Otherwise (if the determination results in "NO"), the flow goes to S713.

Next, in S712, a process for determining whether or not all pieces of the flag information F(x,y) to F(x+Xn,y+Yn) are set to "0" is executed. This process is a process for verifying that difference data for pixels that configure a partial image similar to the most similar partitioned master image Mn is not generated. Here, if it is determined that all the pieces of flag information F(x,y) to F(x+Xn,y+Yn) are set to "0" (the determination results in "YES"), the flow goes to S714. Otherwise (if the determination results in "NO"), the flow goes to S713.

In S713, a process for excluding the most similar partitioned master image Mn from search targets obtained with the search process of S708 is executed. Then, the flow goes back to S708, and the search process is again executed.

Next, in S714, a process for generating difference data is executed. In this process, a motion compensation inter-frame prediction process based on the most similar partitioned master image Mn is initially executed for the above described partial image. Then, a process for generating motion vector information and motion compensation inter-frame prediction error information, which are obtained with this prediction process, as difference data of the partial image from the most similar partitioned master image Mn is executed.

In the process of S714, a data compression process may be executed for the generated difference data, and a process for generating retention data 62 based on the difference data for which the data compression process has been executed, and for storing the generated data in the difference data storing unit 220 may be executed.

Next, in S715, a process for setting, to "1", all the pieces of flag information F(x,y) to F(x+Xn, y+Yn), and for verifying that difference data for pixels that configure the above described partial image has been generated is executed.

Next, in S716, a process for incrementing the value of the variable x by "1" is executed. Thereafter, the flow goes back to S705, and the above described processes are again executed.

The processes described up to this point are the second example of the form image storage control process. The MPU 81 executes this form image storage control process, whereby the computer 80 of FIG. 2 operates as the scan terminal device 100, which can generate retention data for an image of a written form, and can retain the generated data in the storage device 200.

Figure 12:
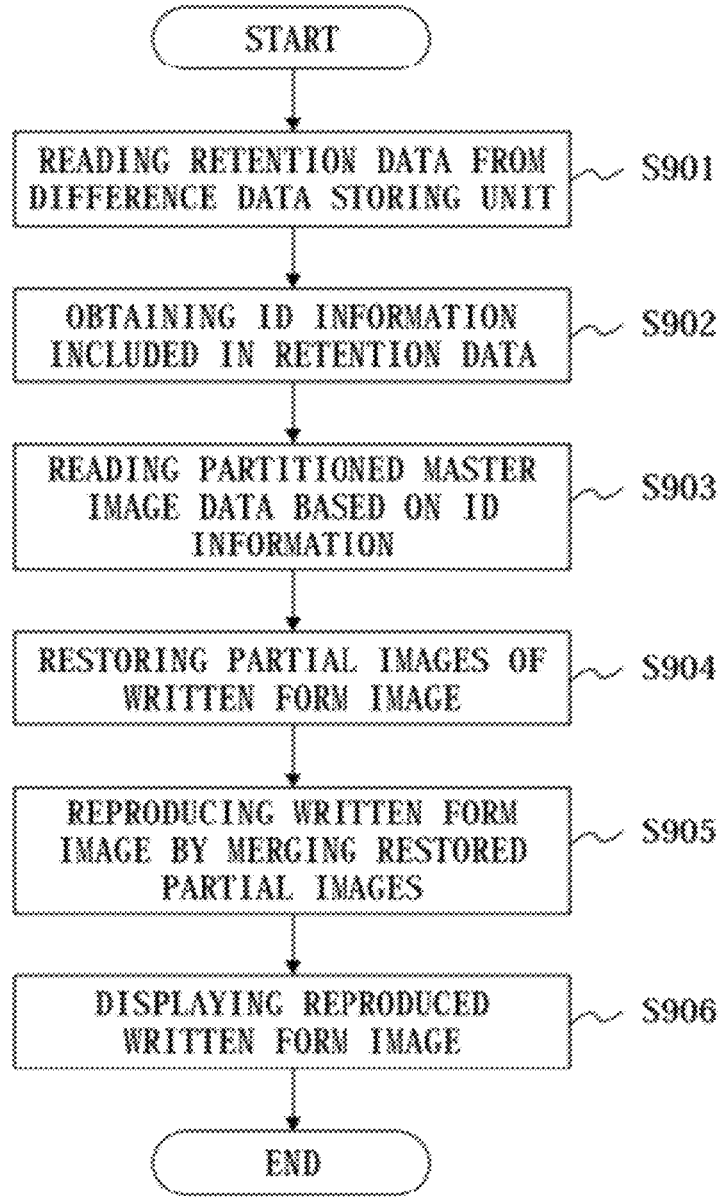
FIG. 12 is a flowchart illustrating contents of a second example of the form image display control process.

FIG. 12 is described next. FIG. 12 is a flowchart illustrating contents of a second example of the form image display control process executed by the MPU 81 when the computer 80 of FIG. 2 is used as the display terminal device 300 in the form image managing system 1 illustrated in FIG. 1. This process is a process executed by the display image data generation processing unit 560 in the configuration of FIG. 7.

The process of FIG. 12 is started when the MPU 81 detects that a user of the display terminal device 300 has input information for specifying an image of a written form to be displayed, and a predetermined process start instruction via the input device 85. If partitioned master image data 97 is used, the master image data 92 is assumed to be read from the master image storing unit 310 in the process of FIG. 12.

In FIG. 12, initially, in S901, a process for reading retention data 62 identified with the information for specifying an image of a written form to be displayed, which is input by the user of the display terminal device 300, by referencing the difference data storing unit 220 of the storage device 200 is executed. If a data compression process has been executed for each piece of difference data included in the read retention data 62, original difference data is restored by executing a data decompression process for each piece of the difference data.

Next, in S902, a process for extracting ID information included in the retention data 62 from the retention data 62 that is read from the difference data storing unit 220 by executing the process of S901 is executed.

Then, in S903, a process for reading, from the master image storing unit 310, partitioned master image data 97 identified with the ID information that is included in the retention data 62 and obtained with the process of S902 is executed.

Next, in S904, a process for restoring partial images of the written form image specified by the user of the display terminal device 300 is executed. Specifically, this process is executed as follows.

Initially, a process for generating the same prediction image as that generated with the above described motion compensation inter-frame prediction process executed at the time of the difference data generation process in S714 of FIG. 11 is executed. The prediction image can be generated by using the partitioned master image data 97 obtained by executing the process of S903, and motion vector information within the difference data included in the retention data 62 that is read by executing the process of S901.

Next, a process for adding, to the generated prediction image, a prediction error represented by motion compensation inter-frame prediction error information included in the difference data within the retention data 62 that is read by executing the process of S901 is executed.

With the above described processes, pluralities of partial images of the written form image are restored.

Next, in S905, a process for reproducing the written form image by arranging and merging the plurality of partial images restored with the process of S904 based on the above described coordinates information of arrangement positions and image size information, which are included in the retention data 62, is executed.

Next, in S906, a process for causing the display device 86 included in the display terminal device 300 to display the written form image reproduced by executing the process of S905 is executed. Upon completion of this process, the form image display control process is terminated.

The MPU 81 executes the above described form image display control process, whereby the computer 80 of FIG. 2 operates as the display terminal device 300, which can read data retained in the storage device 200, and can display an mage of a written form represented with the read data.

In the form image managing system 1, image data of master images or partitioned master images stored in the master image storing units 110, 210 and 310 may be stored, for example, by executing the above described data compression process such as JPEG or the like. As a result, the storage capacities of the master image storing units 110, 210 and 310 can be saved. In this case, original image data is restored by executing a data decompression process when the image data of a master image or a partitioned master image is read from the master image storing unit 110, 210 or 310.

In the configuration of the form image managing system 1 illustrated in FIG. 3, the difference generation processing unit 140 generates difference data of scan data 51 from master image data 92 by performing motion compensation inter-frame prediction. Moreover, the display image data generation processing unit 150 generates the same prediction image as that generated with the motion compensation inter-frame prediction process executed by the difference generation processing unit 140 in order to restore an original form image. Similarly, in the configuration of the form image managing system 1 illustrated in FIG. 7, the difference generation processing unit 550 generates difference data of a partial image of a written form image from partitioned master image data 97 by performing motion compensation inter-frame prediction. Additionally, the display image data generation processing unit 560 generates the same prediction image as that generated with the motion compensation inter-frame prediction process executed by the difference generation processing unit 550 in order to restore a partial image of the written form image.

As a technique of the motion compensation inter-frame prediction, diverse types of widely known methods may be used, and the technique is not limited to the above described one. For example, various types of universal moving picture compression encoding methods (such as H.262 standard, H.264 standard and the like, which are standardized by ITU-T (International Telecommunication Union-Telecommunication standardization sector)) may be adopted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A form image managing apparatus, comprising
a processor configured to execute a process including:
obtaining a master image;
partitioning the obtained master image;
storing partitioned images obtained by partitioning the master image as partitioned master images;
obtains obtaining an image of a form;
searching the stored partitioned master images for a partitioned master image having a high correlation with each of a plurality of partial images obtained by partitioning the image of the form;
generating difference data between the partial image and corresponding partitioned master image having the high correlation with the partial image; and
storing, as form image data that represents the image of the form, identification information for identifying the partitioned master image having a high correlation with the partial images and the difference data by being made to correspond to each of the partial images.

2. The apparatus according to claim 1, the processor configured to further execute a process including:
  calculating a degree of correlation between one partitioned master image obtained by partitioning the master image and each of the plurality of stored partitioned master images; and
  performing a control for storing the one partitioned master image when the degree of correlation is lower than a predetermined value.

3. The apparatus according to claim 1, the processor configured to further execute a process including:
  performing, for the partial image, motion compensation inter-frame prediction based on the partitioned master image having the high correlation with the partial image, and generates, as the difference data, motion vector information and motion compensation inter-frame prediction error information of the partial image from the partitioned master image.

4. The apparatus according to claim 1, the processor configured to further execute a process including:
  executing a data compression process for the generated difference data, and
  storing the difference data for which the processor has executed the data compression process.

5. The apparatus according to claim 1, the processor configured to further execute a process including:
  reading, from the stored form image data, the difference data and the identification information made to correspond to the difference data;
  reading, from the stored partitioned master images, the corresponding partitioned master image identified with the identification information read by the processor; and
  restoring each of the plurality of partial images from the read difference data, and the corresponding partitioned master images, and reproducing the obtained image of the form by merging the restored partial images.

6. A form image managing apparatus, comprising
a processor configured to execute a process including:
  obtaining a master image;
  partitioning the obtained master image;
  storing partitioned images obtained by partitioning the master image as partitioned master images;
  calculating a degree of correlation between one partitioned master image obtained by partitioning the master image and each of the plurality of stored partitioned master images; and
  performing a control for storing the one partitioned master image when the degree of correlation is lower than a predetermined value.

7. A form image managing apparatus, comprising
a processor configured to execute a process including:
  obtaining a master image;
  partitioning the obtained master image;
  storing partitioned images obtained by partitioning the master image as partitioned master images;
  obtaining an image of a form;
  generating difference data between a partial image obtained by partitioning the image of the form and a corresponding partitioned master image having the smallest difference to the partial image among the stored partitioned master images; and
  storing, as form image data that represents the image of the form, identification information for identifying the partitioned master image having a high correlation with the partial images and the difference data by being made to correspond to each of the partial images.

8. A form image managing method, comprising:
  partitioning, by a processor, a master image, and storing the partitioned master images in a partitioned master image storing unit;
  obtaining, by the processor, an image of a form;
  searching, by the processor, the partitioned master image storing unit for a partitioned master image having a high correlation with each of a plurality of partial images obtained by partitioning the image of the form;
  generating, by the processor, difference data between the partial image and corresponding partitioned master image having the high correlation with the partial image; and
  storing, by the processor, as form image data that represents the image of the form, identification information for identifying the partitioned master image having a high correlation with the partial images and the difference data by being made to correspond to each of the partial images.

9. The method according to claim 8, further comprising:
  newly obtaining, by the processor, one partitioned master image;
  calculating, by the processor, a degree of correlation between the one partitioned master image and each of the plurality of partitioned master images stored in the partitioned master image storing unit; and
  storing, by the processor, the one partitioned master image in the partitioned master image storing unit when the degree of correlation is lower than a predetermined value.

10. The method according to claim 8, wherein
in the generating, motion compensation inter-frame prediction based on the partitioned master image having the high correlation with the partial image is performed for the partial image by the processor, and motion vector information and motion compensation inter-frame prediction error information of the partial image from the partitioned master image are generated as the difference data by the processor.

11. The method according to claim 8, wherein
in the generating, a data compression process is executed for the generated difference data by the processor, and
in the storing, the difference data for which the data compression process has been executed is stored in the form image data storing unit by the processor.

12. The method according to claim 8, further comprising:
  reading, by the processor, from the form image data storing unit, the difference data and the identification information made to correspond to the difference data;
  extracting, by the processor, the corresponding partitioned master image identified with the read identification information from among the plurality of stored partitioned master images; and
  restoring, by the processor, each of the plurality of partial images from the read difference data and the corresponding partitioned master image, and reproducing, by the processor, the obtained image of the form by merging the restored partial images.

13. A computer-readable non-transitory recording medium on which is recorded a program for causing a computer to manage a form image, the program comprising:
  partitioning a master image, and storing the partitioned master images in a partitioned master image storing unit;
  obtaining an image of a form;
  searching the partitioned master image storing unit for a partitioned master image having a high correlation with each of a plurality of partial images obtained by partitioning the image of the form;

generating difference data between the partial image and corresponding partitioned master image having the high correlation with the partial image; and storing, as form image data that represents the image of the form, identification information for identifying the partitioned master image having a high correlation with the partial images and the difference data by being made to correspond to each of the partial images.

14. The recording medium according to claim 13, the program further comprising:

newly obtaining one partitioned master image;

calculating a degree of correlation between the one partitioned master image and each of the plurality of partitioned master images stored in the partitioned master image storing unit; and storing the one partitioned master image in the partitioned master image storing unit when the degree of correlation is lower than a predetermined value.

15. The recording medium according to claim 13, wherein in the generating, motion compensation inter-frame prediction based on the partitioned master image having the high correlation with the partial image is performed for the partial image, and motion vector information and motion compensation inter-frame prediction error information of the partial image from the partitioned master image are generated as the difference data.

16. The recording medium according to claim 13, wherein in the generating, a data compression process is executed for the generated difference data, and in the storing, the difference data for which the data compression process has been executed is stored in the form image data storing unit.

17. The recording medium according to claim 13, the program further comprising:

reading, from the form image data storing unit, the difference data and the identification information made to correspond to the difference data;

extracting the corresponding partitioned master image identified with the read identification information from among the plurality of stored partitioned master images; and restoring each of the plurality of partial images from the read difference data and the corresponding partitioned master image, and reproducing the obtained image of the form by merging the restored partial images.

* * * * *